(12) United States Patent
Okamoto et al.

(10) Patent No.: US 6,661,184 B2
(45) Date of Patent: Dec. 9, 2003

(54) LIGHT SOURCE DEVICE

(75) Inventors: Masashi Okamoto, Akashi (JP); Izumi Takaya, Himeji (JP); Takashi Yamashita, Takasago (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/245,359

(22) Filed: Sep. 18, 2002

(65) Prior Publication Data

US 2003/0052622 A1 Mar. 20, 2003

(30) Foreign Application Priority Data

Sep. 18, 2001 (JP) .......................... 2001-283465

(51) Int. Cl.$^7$ .............................................. H05B 37/00
(52) U.S. Cl. .................. 315/289; 315/290; 315/291; 315/261; 315/263; 315/DIG. 5
(58) Field of Search ............................. 315/209 R, 291, 315/276, 278, 282, 289, 290, DIG. 5, DIG. 7, 261, 263, 246, 105, 106

(56) References Cited

U.S. PATENT DOCUMENTS

| | | | |
|---|---|---|---|
| 4,322,658 A | * | 3/1982 | Minarczyk ................. 315/47 |
| 4,398,123 A | * | 8/1983 | Tsuchihashi et al. .......... 315/46 |
| 4,673,843 A | | 6/1987 | Okanuma |
| 6,084,360 A | * | 7/2000 | Yokokawa et al. ......... 315/287 |
| 6,552,502 B2 | * | 4/2003 | Okamoto et al. ........... 315/336 |

FOREIGN PATENT DOCUMENTS

| JP | 37-008045 | 4/1937 |
|---|---|---|
| JP | 5-54983 A | 3/1993 |

* cited by examiner

*Primary Examiner*—Haissa Philogene
(74) *Attorney, Agent, or Firm*—Nixon Peabody LLP; David S. Safran

(57) ABSTRACT

The restart properties of a light source even under the condition of a hot restart is improved, and suppression of the danger of an insulation breakdown in an unintended area is achieved by a light source comprising a discharge lamp in which a pair of main discharge electrodes are located opposite a discharge space; an auxiliary electrode arranged such that it does not come into contact with the discharge space; a feed circuit that supplies a discharge current to the main discharge electrodes; and a starter that produces a high voltage between one of the main discharge electrodes and the auxiliary electrode, wherein, during a time interval during which the starter produces said high voltage, a high voltage is also applied to the main discharge electrodes at least during a portion of the time interval.

15 Claims, 18 Drawing Sheets

LIGHT SOURCE DEVICE

BACKGROUND OF THE INVENTION

1. Field of the Invention

The invention generally relates to a light source device having a high pressure mercury discharge lamp. In particular, the invention can be used, for example, as a light source for a projector.

2. Description of the Related Art

In a light source device for an optical device, such as a liquid crystal projector, a DLP, or the like, a discharge lamp with high radiance (HID lamp) is used. Recently however there has been a demand for a greater amount of mercury to be added to the discharge lamp than in the conventional case in order to make the optical device more radiant. In one such discharge lamp it is necessary to produce a high voltage during start-up by using a starter to subject a discharge space to an insulation breakdown, and thus to start a discharge.

FIG. 19 shows an arrangement of a conventional discharge lamp light source device. In a light source device for an optical device, conventionally a starter (Ui) is used between the electrodes (E1, E2) to which a high voltage is applied. The secondary winding (Si) of the high voltage transformer (T1) of the starter is series connected to the discharge lamp (Li). After starting a discharge, the function of the starter (Ui) is thus no longer necessary. The discharge current supplied to the discharge lamp (Li) must nevertheless flow via the secondary winding (Si) of the high voltage transformer which has a large winding number. To suppress the formation of heat loss in the secondary winding (Si), it is necessary to make the wire diameter of the winding large, resulting in the disadvantage that an increase in the size and weight of the starter (Ui) is inevitable.

As a measure for eliminating this defect, an outside trigger method can be used which is often used for the trigger in a blinking lamp. With this method, besides the first electrode and the second electrode acting as the two main discharge poles, i.e., an arc discharge after starting, there is an auxiliary electrode. Between the auxiliary electrode and the first or second electrode, a high voltage is applied, plasma is produced by a dielectric barrier discharge in the discharge space, and between the first electrode and the second electrode the main discharge is started by means of a voltage applied beforehand (no-load voltage) by means of the plasma.

After starting the discharge in the primary winding and the secondary winding of the high voltage transformer of the starter, no discharge current flows to the discharge lamp. Thus, in the primary and secondary windings of the high voltage transformer of the starter no heat loss forms. Therefore, both an increase in size and an increase in weight of the starter can be avoided.

In a discharge lamp with a large amount of added mercury, the pressure in the discharge lamp is low due to the condensation of the mercury when the discharge lamp is in the cold state. In this case, starting can take place relatively easily. However, the case of a hot discharge lamp, which can occur shortly after turning off the lamp, the pressure in the discharge space is high due to the vaporized mercury. This is disadvantageous in that a hot restart of the lamp is difficult.

The disadvantage of a difficult hot restart for an optical device such as a projector, or the like, is the disadvantage of convenience of use by the user of this device. This disadvantage of difficult restart has furthermore become more and more serious in recent years due to the increase in the amount of mercury added to implement the outside trigger method.

On the other hand, the conventional discharge lamp (Li) and a feed device (Ni) were connected to one another by feed lines (K1, K2). The starter (Ui) for starting the discharge lamp (Li) was located on a side of the feed circuit. The starter (Ui) produced a high voltage. In the case in which the starter (Ui) produces a pulsed high voltage, the feed lines (K1, K2) are exposed to a high voltage within a short time, which created strong noise.

Furthermore, "dulling distortion" of the pulsed high voltage is caused by an electrostatic potential which forms between the feed lines (K1, K2), a conductance in the environment, and by the inductance of the feed lines (K1, K2). The increase in the voltage between the electrodes (E1, E2) is therefore reduced. In order to obtain the pulsed voltage necessary for starting the discharge lamp, more energy than necessary must be delivered by the starter (Ui) in the direction of the feed lines (K1, K2). Moreover, the pulse width is broadened by the "dulling distortion" of the pulsed high voltage. In this way, the possibility of the formation of an insulation breakdown in an unintended area, such as the insulation coating of the high voltage transformer (T1) of the starter and the feed lines (K1, K2) or the like, is increased. In this way, there is the danger of a reduction in reliability.

On the other hand, in the case of a DC starter which produces a relatively slowly increasing high voltage, the insulation breakdown phenomenon takes place more frequently, and in proportion to the higher the voltage and the longer the voltage application time. In this instance, one disadvantage is the possibility that the formation of an insulation breakdown in an unintended area increases even more.

For conventional inventions and concepts for starting a high pressure discharge lamp using the outside trigger method, reference can be made to, for example, Japanese Utility Model SHO 37-8045. Here an arrangement is disclosed in which there is a coil which produces a magnetic force, and controls in the operation of a starter circuit which produces a high voltage in the auxiliary electrode by a magnetic force.

Furthermore, in the invention described in Japanese patent disclosure document HEI 5-54983, an arrangement is disclosed in which in the discharge lamp, such as in a high pressure mercury lamp or the like, there are auxiliary electrodes (outside electrodes) adjacent to one another with a distance of a few millimeters to one another.

SUMMARY OF THE INVENTION

However, in these conventional inventions and concepts, the formation of an insulation breakdown in an unintended area during restart were not considered at all.

An exemplary object of the invention is to eliminate the disadvantages of the prior art. These disadvantages at least are:

- an increase in size or an increase in weight of the starter cannot be avoided if heat loss in the windings is to be avoided,
- that restart is difficult shortly after turning off and the discharge lamp is hot;
- noise concerns;
- as a result of capacitive coupling between the feed lines and the conductor in the vicinity of the starter, greater energy than necessary must be delivered in the direction of the feed lines; and the possibility of the formation of an insulation breakdown in an unintended area increases thus causing a reduction in reliability.

In a first aspect of the invention in a light source device the following components are connected to one another:

a discharge lamp (Ld) in which a pair of main discharge electrodes (E1, E2) are located opposite to the discharge space (12) and moreover an auxiliary electrode (Et) is arranged such that it does not come into contact with the main discharge space (12);

a feed circuit (Bx) for supplying a discharge current to the main discharge electrodes (E1, E2); and a starter (Ue) which produces a high voltage between one of the electrodes (E1, E2) for the main discharge and the auxiliary electrode (Et), an object is achieved in that during the interval during which the starter (Ue) produces a high voltage, a high voltage is also applied at least during part of this interval to the main discharge electrodes (E1, E2).

The object is achieved in a second aspect of the invention in that in the above described invention the high voltage which is produced by the starter (Ue) and which is applied at least partially overlapping in time to the main discharge electrodes (E1, E2) is at least 2.5 times as high as the glow discharge voltage of the discharge lamp (Ld).

The object is furthermore achieved in that the discharge lamp (Ld) contains greater than or equal to 0.15 mg mercury per cubic millimeter of volume of the discharge space (12), and that the high voltage which is also applied to the main discharge electrodes (E1, E2) is greater than or equal to 500 V and at least partially overlaps in time with the interval during which the starter (Ue) produces the high voltage.

The object is moreover achieved in that the high voltage which is also applied to the main discharge electrodes (E1, E2) is pulse-like and at least partially overlaps in time with the interval during which the starter (Ue) produces the high voltage.

The object is moreover achieved in that when a discharge is produced within the discharge space (12) by the high voltage of the starter (Ue), the high voltage which is applied to the main discharge electrodes (E1, E2) is produced by the electrode which is located on the side on which the starter (Ue) is not connected.

The object is moreover achieved in that a high voltage generating part (Ub) which comprises at least one high voltage transformer (Te) of a starter circuit is separated from the feed circuit part (By).

In the outside trigger method the starting property cannot be enhanced simply by increasing only one of the voltages. Specifically the high voltage applied between either the first electrode (E1) or the second electrode (E2) and the auxiliary electrode (Et) and the no-load voltage is needed in order to start the actual main discharge.

It is specifically necessary, according to the time after turning off, i.e., according to the conditions of the discharge lamp at the instant of starting, such as the temperature and the like, to apply the high voltage and no-load voltage in a suitable equilibrium. Moreover, depending on the time lapse after turning off either the high voltage to be applied or the no-load voltage or the two are very high, even if a suitable equilibrium is being maintained, there is the danger of the formation of an insulation breakdown in an unintended area.

With respect to the limit of dielectric resistance which can be imparted to the light source device, the limit being is set with respect to the compactness and economic efficiency which are required of the optical device. There is therefore a minimum time lapse after turning off in which a restart is possible.

With consideration of these circumstances a first aspect of the invention is described first using FIG. 1 and FIG. 2 which relate to tests by the inventors. FIG. 1 shows the result of a test using a discharge lamp which contains 0.15 mg mercury per cubic millimeter of volume of the discharge space and in which the distance between the main discharge electrodes which act as the two poles for the main discharge, i.e., the first electrode and the second electrode, is 1.2 mm.

The test was run, as shown in FIG. 2, such that a DC source (Mx), a feed circuit (Bx) and a starter (Ue) were connected to the lamp (Ld). In order to deliver an independent voltage to the primary winding (Pe) of the high voltage transformer of the starter and to the no-load voltage applied to the main discharge electrodes (E1, E2), a variable voltage source (Vp) and a variable voltage source (Va) were connected. In the state in which the no-load voltage was applied to the discharge lamp (Ld), a high voltage pulse which the starter (Ue) produces was applied between the first electrode (E1) and the auxiliary electrode (Et).

The reason for applying the no-load voltage to the discharge lamp (Ld) as the charging voltage for the capacitor (Ca) via a resistor (Ra) with a high resistance value is as follows:

When the discharge lamp (Ld) is started, the capacitor (Ca) quickly supplies a current. After starting the discharge lamp (Ld), the resistance value of the resistor (Ra) is high. Application takes place therefore to prevent the variable voltage source (Va) from influencing the operation of the feed circuit (Bx).

The peak voltage (Vtrg) of the high voltage pulse of the starter (Ue) was set by setting the variable voltage source (Vp) to 4.4 kV, 8.3 kV, 12.1 kV and 16.1 kV. These values were measured in the state in which the connection of a secondary winding (Se) of the high voltage transformer of the starter to the auxiliary electrode (Et) of the discharge lamp was interrupted. The voltage which formed in the secondary winding (Se) of the high voltage transformer of the starter (Ue) was measured using an oscilloscope.

During operation of the starter (Ue), the discharge lamp (Ld) was operated for four minutes and, at the instant the discharge lamp is turned off was taken as the reference point. After a suitable time interval the discharge lamp (Ld) was operated and the time until successful starting of the lamp (Ld) and accordingly the time (Trst) during which a restart is impossible were measured (y-axis in FIG. 1).

The no-load voltage (Vopn) was measured such that the variable voltage source (Va) was set essentially to 280 V, 350 V, 500 V, 750 V, 1000 V, 1300 V, 1600 V and 1900 V and that the voltage applied to the main discharge electrodes (E1, E2) with actual successful starting of the discharge lamp (Ld) was measured using an oscilloscope (x-axis in FIG. 1).

The following can be taken immediately from FIG. 1:
the more the peak voltage (Vtrg) of the high voltage pulse of the starter (Ue) is increased, and the more the no-load voltage (Vopn) is increased, the more the time (Trst) during which a restart is impossible is shortened.

As was described in the means for achieving an object of the invention, during the time interval which overlaps with the interval during which the starter (Ue) produces a high voltage, a high voltage is applied as a no-load voltage to the main discharge electrodes (E1, E2), the amount of time during which a hot restart is impossible is shortened and the disadvantage that a hot restart is difficult is eliminated.

Preferred embodiments of the invention are described below.

The time during which a restart is impossible is shortened, and the more the no-load voltage is increased, can be physically interpreted as follows:

As was described above, the high voltage of the starter (Ue) is applied to the auxiliary electrode (Et). A plasma is produced in the discharge space by a dielectric barrier discharge. A glow discharge will be produced between the main discharge electrodes (E1, E2) by means of the plasma from the applied no-load voltage. This is a random phenomenon which is dependent on the density of gas atoms present in the discharge space. To produce a glow discharge, a higher no-load voltage is needed, and a higher temperature of the discharge lamp. This increases the probability of the formation of a glow discharge proportional to the increase of the no-load voltage, and the time during which a restart is impossible is shortened.

In a more detailed examination of FIG. 1 it becomes apparent that regardless of the peak voltage (Vtrg) of the high voltage pulse of the starter (Ue), the time during which a restart is impossible in the range up to roughly 500 V is quickly shortened by increasing the no-load voltage. Furthermore, the difference in the time during which a restart is impossible is further reduced. In the case where the no-load voltage is further increased, the time during which a restart is impossible continues to be shortened, but the degree of shortening is reduced. Furthermore, it becomes apparent that in the range of greater than or equal to roughly 1600 V, the time during which a restart is impossible is no longer shortened very much even if the no-load voltage is increased even further.

It is therefore feasible in the case of using this discharge lamp in an actual light source device, a voltage of at least 500 V, preferably of greater than or equal to 600 V, can be applied as a no-load voltage. Furthermore, it is advantageous to keep it at less than or equal to 1600 V in order to prevent the increased danger of insulation breakdown in an unintended area.

Even if by applying the high voltage of the starter (Ue) a glow discharge is successfully produced, for its transition into an arc discharge it is necessary to supply a discharge plasma with energy sufficient to achieve continued formation of a thermionic emission of the electrodes. According to the increase of the no-load voltage, the reliability of starting a discharge of the discharge lamp increases. It can be imagined that the reason for this is the following:

In contrast to the case of a glow discharge, the energy for a thermionic emission is dependent on the density of the gas atoms present in the discharge space. It can therefore be imagined that saturation begins occurring at 500 V.

Hence it follows that the curves in FIG. 1, which are shown using groups of plot data, were formed by the fact that for one plot, for which producing the glow discharge during the time during which a restart is impossible is shortened, is proportional to the increase of the no-load voltage, and for other plot, for which for the transition into an arc discharge the time at which a restart is impossible is shorted, is proportional to the increase of the no-load voltage which is saturated at a voltage of 500 V, have been superimposed.

The plot for which for the transition into an arc discharge the time during which a restart is impossible is shortened being proportional to the increase of the no-load voltage depends on how much wattage can be delivered in addition in the successful formation of a glow discharge for the transition into the arc discharge. This phenomenon therefore depends on the glow discharge voltage of the discharge lamp.

A typical glow discharge voltage used in the test shown in FIG. 1 is 180 V to 220 V. Using an average of approximately 200 V, and in conjunction with the voltage of 500 V, for which the sudden shortening tendency of the time for which a restart is possible decreases, it is feasible to apply as the no-load voltage a voltage which is at least 2.5 times, preferably three times, as high as the typical glow discharge voltage of the discharge lamp.

In conjunction with the voltage of 1600 V, for which the time during which a restart is impossible is hardly shortened any further, it is advantageous to keep the voltage at less than or equal to 8 times as high as the typical glow discharge voltage of the discharge lamp in order to prevent the increased danger of insulation breakdown in an unintended area.

Based on one such guideline it is necessary in the design a feed device for the light source device for a certain experimental discharge lamp to determine the typical glow discharge voltage (Vg) of the experimental discharge lamp through testing. In this case, an experimental DC voltage source which has a voltage (Vs) roughly five times as high as the arc discharge voltage during steady-state operation of the experimental discharge lamp, i.e. its nominal voltage, and a current limiter resistor which is approximated as follows:

The nominal wattage during steady-state operation of this experimental discharge lamp is divided by the nominal voltage, from which the nominal current is determined. The voltage (Vs) of the experimental DC voltage source is divided by the nominal current. The current limiter resistor is roughly equal to this value.

Furthermore, the experimental discharge lamp and the current limiter resistor are connected in series to one another and the experimental DC voltage source is connected thereto. The voltage between the electrodes for the main discharge of the experimental discharge lamp, i.e. the lamp voltage (VL), during starting by operation of the starter (Ue) can be determined using an oscilloscope.

FIG. 18 shows an illustration of the waveform of the lamp voltage (VL) during starting. At time ti the starter is operated. It is shown that the lamp voltage (VL) before operation of the starter is equal to the voltage (Vs) of the experimental DC voltage source. However, the voltage quickly drops after operation of the starter, to a flat voltage for a short time interval (Ag) and that afterwards the voltage continues to drop rapidly until it passes into an arc discharge area (Aa).

In the time interval (Ag) a glow discharge forms. By measuring the voltage at this instant, the typical glow discharge voltage (Vg) for the experimental discharge lamp can be determined. The length of the time interval (Ag) of the glow discharge differs depending on the lamp structure, the electrode material, the composition of the contents, or the like, and is normally in the range of a few microseconds to a few dozen milliseconds.

The observed waveform of an actual lamp voltage (VL) during starting however changes depending on the state of the discharge lamp. For example, the observed waveform can depend on the duration of the immediately preceding operation, the time lapse after turning off, the adhesion state of the mercury to the electrodes, and the like. Furthermore, there are also cases in which an arc discharge forms first due to the presence of the mercury and in which the glow discharge cannot be clearly observed, especially when mercury is adhering to the cathode.

It is therefore advantageous to carry out the observation in the state in which no mercury is adhering to the cathode, and after natural air cooling of, for example, after roughly 20 minutes. The state in which no mercury is adhering to the cathode is obtained such that the experimental discharge lamp is operated for roughly five minutes, the mercury is thus completely vaporized and that the lamp is turned off afterwards and kept such that the cathode is on the top.

Even in the case in which the experimental discharge lamp is designed for AC operation, the above described process for measuring the glow discharge voltage can be used since the observation is carried out only in the short time from after starting to immediately after the transition to the arc discharge.

As was described above, through this arrangement of the light source device, the restart properties are also improved in the instance of a hot restart, and furthermore, the discharge current of the discharge lamp (Ld) does not flow in the primary winding (Pe) and in the secondary winding (Se) of the high voltage transformer (Te) of the starter (Ue) until after starting the discharge of the discharge lamp (Ld), since the outside trigger method is used. Therefore no heat loss forms in the primary winding (Pe) and in the secondary winding (Se) of the high voltage transformer (Te) of the starter (Ue) therefore no heat loss forms. Thus a light source device can be implemented in which an increase in size and weight of the starter (Ue) is avoided.

Another embodiment of the invention is described below. As was described above, to shorten the time during which a restart is impossible it is a good idea to apply a no-load voltage, i.e., a high voltage, to the main discharge electrodes (E1, E2) as well to the apply the high voltage from the starter (Ue) to the auxiliary electrode (Et). This no-load voltage is a high voltage however need not always be a DC voltage. For example, only a brief AC high voltage is necessary in a feed device for AC operation.

For shortening the time during which restart is impossible, the time interval before formation of the high voltage at the starter (Ue) the high voltage—no-load voltage applied to the main discharge electrodes (E1, E2) is unimportant. In contrast, there is even the possibility that the danger of formation of an insulation breakdown in an unintended area is increased by the no-load voltage being a high voltage. Therefore the level of the dielectric resistance which is necessary for safety must be increased not only for the wire with the high voltage between the starter (Ue) and the auxiliary electrode (Et), but also for the wire between the feed device and the main discharge electrodes (E1, E2).

By increasing the no-load voltage applied to the main discharge electrodes (E1, E2) in a pulse-like manner, the time during which the high voltage is applied is shortened in the wire between the feed device and the main discharge electrodes (E1, E2). Therefore the danger of formation of an insulation breakdown in an unintended area can be reduced.

In the case in which the high voltage of the starter (Ue) is a DC voltage, after starting the starter (Ue), the no-load voltage can be increased in a pulse-like manner. In the case in which the high voltage of the starter (Ue) is pulse-like, it is necessary to synchronize the operation of the starter with the operation of the pulse-like increase of the no-load voltage and to reliably superimpose the two on one another during the interval the high voltage of the starter (e) and the pulse-like increase are formed.

By arranging the light source device according to one preferred embodiment of the invention, the hot restart properties are improved. Furthermore, a light source device can be implemented in which an increase in the size and weight of the starter (Ue) is avoided and in which the danger of an insulation breakdown in an unintended area is reduced.

The invention is described below according to another embodiment of the invention. As is shown in FIG. 3, when a high voltage is applied from one end of the secondary winding (Se) of the high voltage transformer (Te) of the starter (Ue) to the auxiliary electrode (Et) of the discharge lamp (Ld), between the inside of the discharge vessel (11) and the main discharge electrode (E1) on the side on which the other end of the secondary winding (Se) of the high voltage transformer (Te) is connected, a discharge path (Dp1) is formed and a dielectric barrier discharge produced.

However, between the inside of the discharge vessel (11) and the main discharge electrode (E2) on the side on which the other end of the secondary winding (Se) of the high voltage transformer (Te) is not connected, a discharge path (Dp2) is formed and a dielectric barrier discharge produced. The reason for this is the following:

A potential difference of at most roughly a few hundred V to 2 kV is applied to the electrodes (E1, E2). Since a voltage, for example, of roughly a few kV to a dozen or so kV is applied to the auxiliary electrode (Et), the potential difference between the electrodes (E1, E2) is sufficient for the main discharge.

Therefore an electrical charge is supplied by the dielectric barrier discharge to the main discharge electrode (E2) on the side on which the other end of the secondary winding (Se) of the high voltage transformer (Te) is not connected. Therefore it can be exposed to a high voltage by trying to prevent this electrical charge from breaking down. By exposure to a high voltage, a high voltage no-load voltage can be supplied to the two poles of the main discharge electrodes (E1, E2).

An especially simple arrangement of the feed device shown in FIG. 3 can prevent the electrical charge delivered by the dielectric barrier discharge from disappearing. Here the feed device is specifically arranged such that between the feed circuit (Bx) and the main discharge electrode (E2) on the side on which the other end of the secondary winding (Se) of the high voltage transformer (Te) is not connected, a diode (Dz) is inserted.

A high voltage pulse originates from the secondary winding (Se) of the high voltage transformer (Te). Thus, in the secondary winding of the transformer, essentially only one alternating current can form. By the inductance of the secondary winding (Se) and by a LC resonant circuit which is formed by the electrostatic capacity and the floating electrostatic capacity of the auxiliary electrode (Et) connected to it, a damping oscillation alternating high voltage is formed at the auxiliary electrode (Et).

During positive and negative phases with high absolute values of the voltage of the damping oscillation AC wave the above described dielectric barrier discharge is formed in each half period. In the case in which the auxiliary electrode (Et) is discharged during a negative phase, an attempt is made to negatively charge the main discharge electrode (E2) on the side on which the other end of the secondary winding (Se) of the high voltage transformer (Te) is not connected. In this case, the loaded electrical charge is neutralized because a current flows in the forward direction in the diode (Dz).

In the case in which the auxiliary electrode (Et) has been discharged during a positive phase, an attempt is made to positively charge the main charge electrode (E2) on the side on which the other end of the secondary winding (Se) of the high voltage transformer (Te) is not connected. But since in this case no current flows in the diode (Dz) through a reciprocal connection, the positively charged high voltage which is formed becomes a no-load voltage which is supplied to the main discharge electrodes (E1, E2). Therefore a main discharge can be induced between the electrodes (E1, E2) as the two poles, a dielectric barrier discharge is formed between the main discharge electrode (E1) on the side on which the other end of the secondary winding (Se) of the high voltage transformer (Te) is connected, which also continues after charging, on the inside of the discharge vessel (11).

In another embodiment, the hot restart property is also improved, and thus a light source device can be implemented in which an increase in size and weight of the starter is avoided, while keeping the arrangement for supplying a no-load voltage to the electrodes (E1, E2).

FIG. 3 shows an especially simple case. For a practical application it is however desirable to insert, for example, a protective component parallel to the electrodes (E1, E2), or parallel to the diode (Dz), with a resistance decreasing in the case of the application of a voltage which exceeds a given voltage, such as a varistor or the like, in order to prevent the diode (Dz) from being destroyed when the charging voltage of the electrode (E2) on the side to which the other end of the secondary winding (Se) of the high voltage transformer (Te) is not connected becomes too high.

A further embodiment of the invention is described below. The length of the current conduction path for connection of a circuit part on the secondary side of the high voltage transformer (Te) to the auxiliary electrode (Et) can be reduced by arranging the high voltage generating part (Ub) of the starter circuit, which comprises the high voltage transformer (Te), separately from the feed circuit part (By). In this way, the electrostatic capacity which is formed between the current conduction path connecting the circuit on the secondary side of the high voltage transformer (Te) to the auxiliary electrode (Et), and the conductor in the vicinity can be reduced. Furthermore the inductance of the current conduction path can be decreased. In the case in which the starter produces a pulsed high voltage, the negative effect is suppressed that the "dulling distortion" of the pulsed high voltage which is caused by the presence of the electrostatic capacity of the current conduction path and the presence of the inductance reduces the increase of the voltage between the electrodes. Furthermore, the disadvantage that greater energy than necessary must be delivered is likewise eliminated. Also, the possibility that the "dulling distortion" of the pulsed high voltage increases the pulse width and that in an unintended area an insulation breakdown is formed can be suppressed. Since the length of the current conduction path connecting the circuit part on the secondary side of the high voltage transformer (Te) to the auxiliary electrode (Et) can be reduced and thus the loop area can be made smaller, noise can be eliminated.

Because the length of the connecting wire between the starter and the auxiliary electrode (Et) is small, the possibility of the formation of an insulation breakdown can also be suppressed when the starter produces the high voltage during which the voltage increases relatively slowly.

For the high voltage transformer (Te) of the starter which produces a high voltage, its insulation efficiency is inevitably degraded by frequent use. On the other hand, the discharge lamp (Ld) has its limited service life. It must therefore be unconditionally replaced by a new discharge lamp after a limited time of use. Due to the integral arrangement of the discharge lamp (Ld) at least with the high voltage transformer (Te) of the starter, when the discharge lamp is replaced the high voltage transformer (Te) of the starter must also be replaced. Thus the danger of insulation breakdown as a result of degradation of the insulation efficiency of the high voltage transformer (Te) of the starter can be prevented.

Furthermore, there are the advantages that the possibility of formation of an insulation breakdown in an unintended area is reduced and that the disadvantage of noise is also reduced in the case in which the starter produces a pulsed high voltage by the measure that the length of the connecting line between the starter and the auxiliary electrode (Et) is reduced even more. In this case, the integral arrangement with an optical means for controlling emissions from the discharge lamp (Ld) in a certain direction, such as a concave reflector or the like, simplifies the interchangeability of the discharge lamp.

The arrangement of the light source device according to this development of the invention improves hot restart properties, and a light source device can be implemented in which an increase in size and weight of the starter (Ue) is avoided, and in which the danger of an insulation breakdown in an unintended area is greatly reduced, and noise is reduced.

The invention is further described below using several embodiments shown in the drawings.

DETAILED DESCRIPTION OF THE INVENTION

Figure 4:
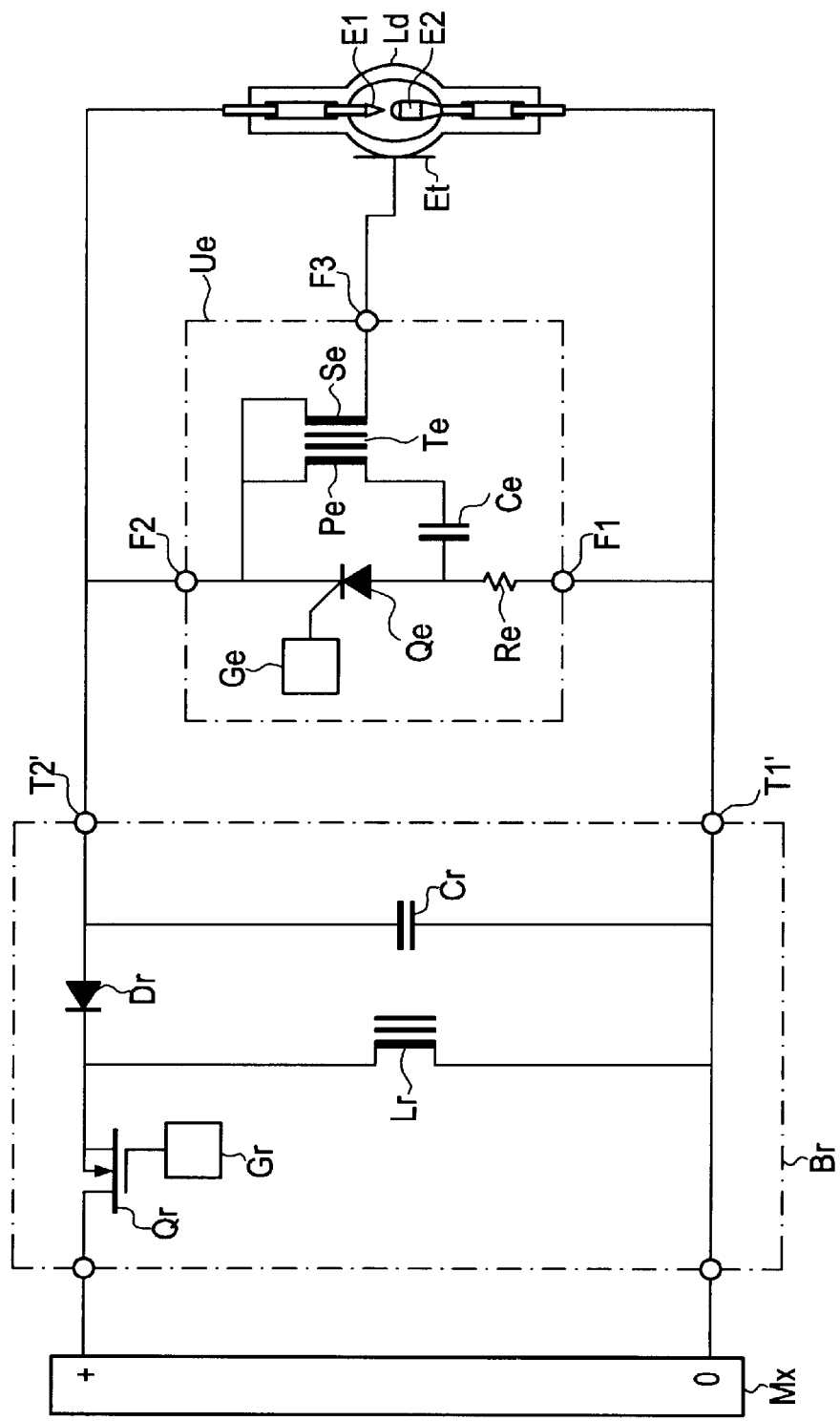
FIG. 4 shows a schematic of a first embodiment of a light source device of the invention using an inverting chopper.

FIG. 4 shows one embodiment of the invention. In particular, a DC source (Mx) such as a PFC (Power Factor Corrector) or the like is connected to an inverting chopper type feed circuit (Br). In the feed circuit (Br), by turning on the switching device (Qr), such as a FET or the like, current flows from the DC source (Mx) to a choke (Lr) and by the inductive action of the choke (Lr), when the switching device (Qr) is turned off, a smoothing capacitor (Cr) is charged via the diode (Dr).

The output of the feed circuit (Br) at the output point (T2') has negative voltage when the output point (T1') is viewed as a reference. But by controlling the pulse duty factor of the switching device (Qr) to a suitable value, the absolute value of this voltage can be made lower or higher than the voltage of the DC source (Mx), which is the input to the feed circuit (Br).

A gate signal with a suitable pulse duty factor from a gate driver circuit (Gr) is delivered to the switching device (Qr) such that the discharge current which flows between the main discharge electrodes (E1, E2) of the discharge lamp (LD), the voltage between the electrodes (E1, E2) or the lamp wattage as the product of this current and this voltage has a suitable value which corresponds to the state of the discharge lamp (Ld). This prevents the output voltage in the voltage reduction chopper from being limited to less than or equal to the voltage of the input DC source.

Normally, for suitable control of the lamp current, the lamp voltage or the lamp wattage, there is a voltage divider or shunt resistor for determining the voltage of the smoothing capacitor (Cr) and the current supplied by the smoothing capacitor (Cr) to the discharge lamp (Ld). Furthermore, normally there is a control circuit which makes it possible for the gate driver circuit (Gr) to produce a suitable gate signal (not shown).

During operation of the discharge lamp (Ld) before starting, the no-load voltage which has been produced by the feed circuit (Br) is applied between the main discharge electrodes (E1, E2) of the discharge lamp (Ld). It is advantageous for the no-load voltage to be at least 2.5 times as high as the glow discharge voltage, preferably three times as high as the glow discharge voltage, as was described above, or for it to be fixed at least at 500 V, preferably at 600 V in the case in which the discharge lamp (Ld) contains greater than or equal to 0.15 mg mercury per cubic millimeter volume of the discharge space (12). This can shorten the time during which a restart is impossible under the condition of a hot restart.

Since the input point (F1) on the high voltage side and the input point (F2) on the low voltage side of the starter (Ue) are connected in parallel to the discharge lamp (Ld), the same voltage as the voltage applied to the discharge lamp (Ld) is also supplied to the starter. When this voltage is received, a capacitor (Ce) is charged via a resistor (Re) at the starter (Ue).

By closing the switching device Qe, such as a SCR thyristor or the like, via a gate driver circuit (Ge) with suitable timing, the charging voltage of the capacitor (Ce) is applied to the primary winding (Pe) of the high voltage transformer (Te). In the secondary winding (Se) of the high voltage transformer (Te) an elevated voltage is formed which corresponds to the configuration of the high voltage transformer (Te). In this case, the voltage applied to the primary winding (Pe) is quickly reduced according to the discharge capacitor (Ce). The voltage which forms in the secondary winding (Se) therefore also drops rapidly. The voltage which forms in the secondary winding (Se) therefore becomes a pulse.

One end of the secondary winding (Se) of the high voltage transformer (Te) is connected to one of the electrodes of the discharge lamp (Ld), and specifically to the electrode (E1) (i.e., the cathode in this case). The other end of the secondary winding (Se) of the high voltage transformer (Te) is connected to the auxiliary electrode (Et) which is located outside of the discharge vessel (11) of the discharge lamp (Ld). A discharge is produced through a dielectric barrier discharge by the high voltage which forms in the secondary winding (Se) of the high voltage transformer (Te) between the inside of the discharge vessel (11) of the discharge lamp (Ld) and one electrode (E1) of the discharge lamp (Ld) and between the inside of the discharge vessel (11) of the discharge lamp (Ld) and the other electrode (E2) of the discharge lamp (Ld) (the anode in this case).

Figure 1:
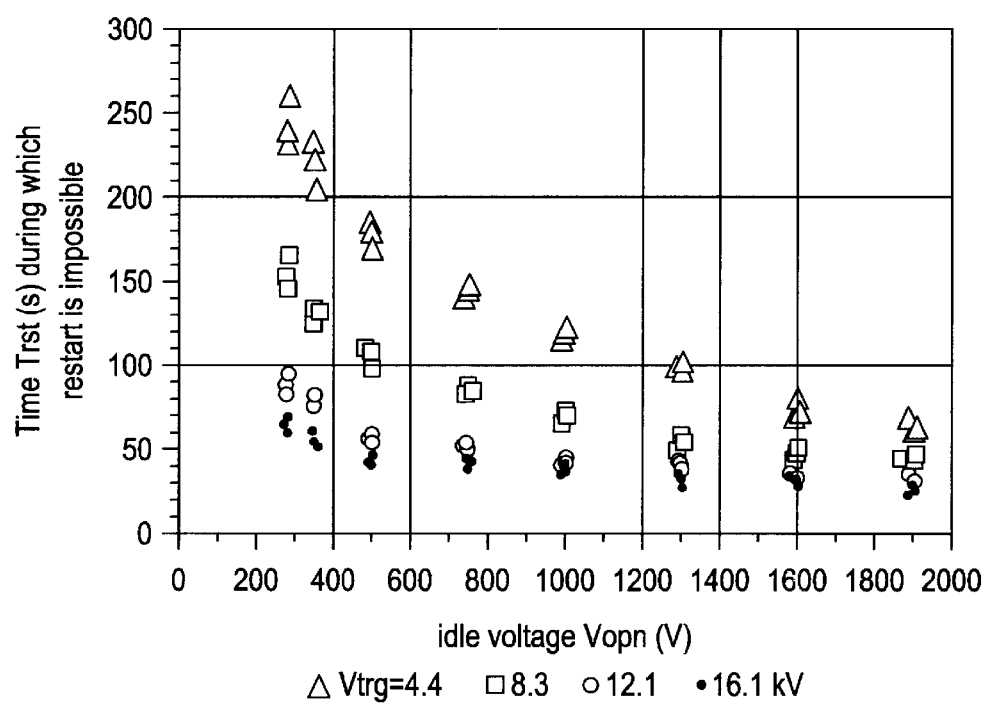
FIG. 1 shows a schematic of the result of a test in which the no-load voltage and the time during which a restart is impossible were measured at different starter voltages.
Figure 2:
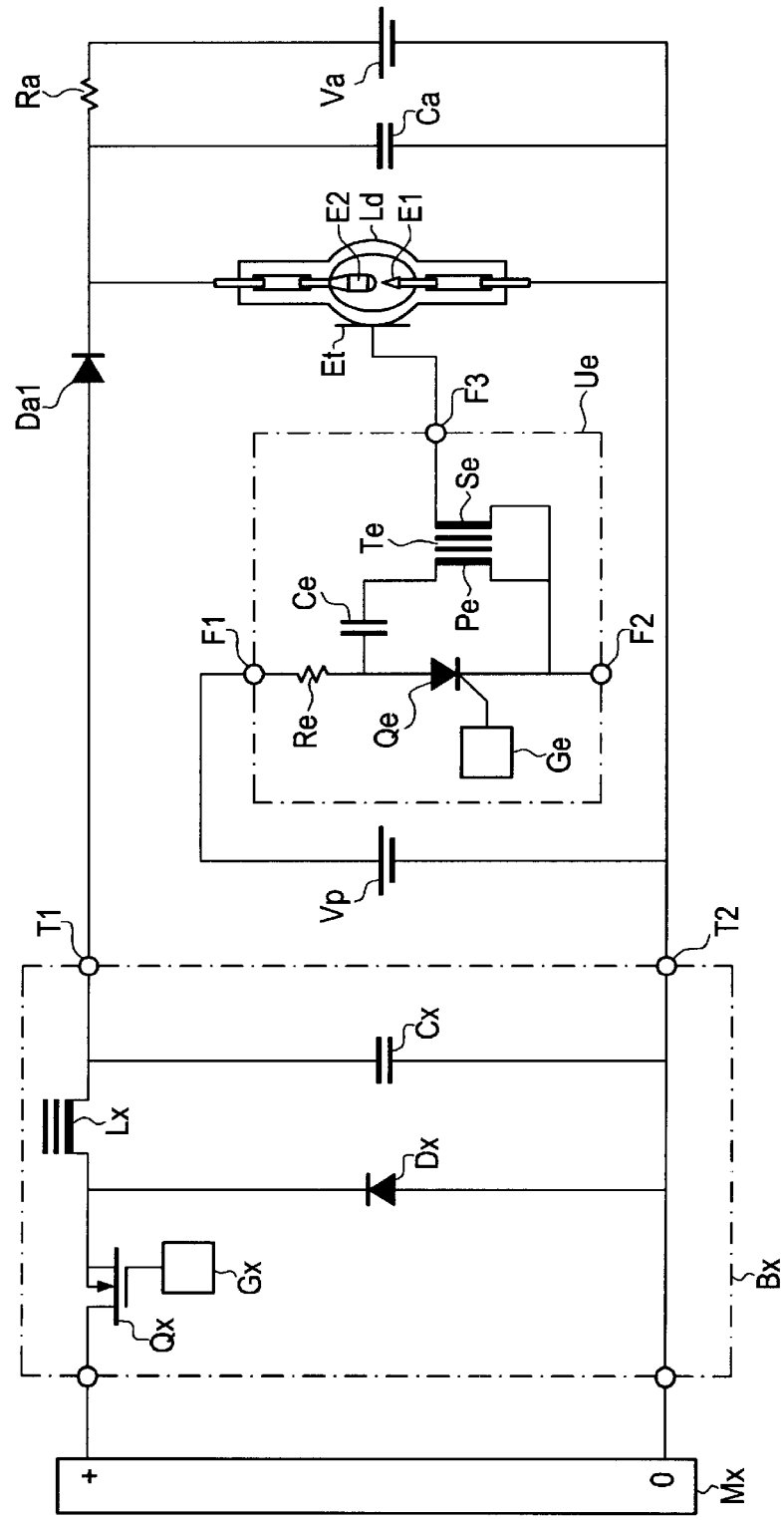
FIG. 2 shows a schematic of the arrangement of an experimental circuit for the measurements as shown in FIG. 1 and FIG. 2.
Figure 3:
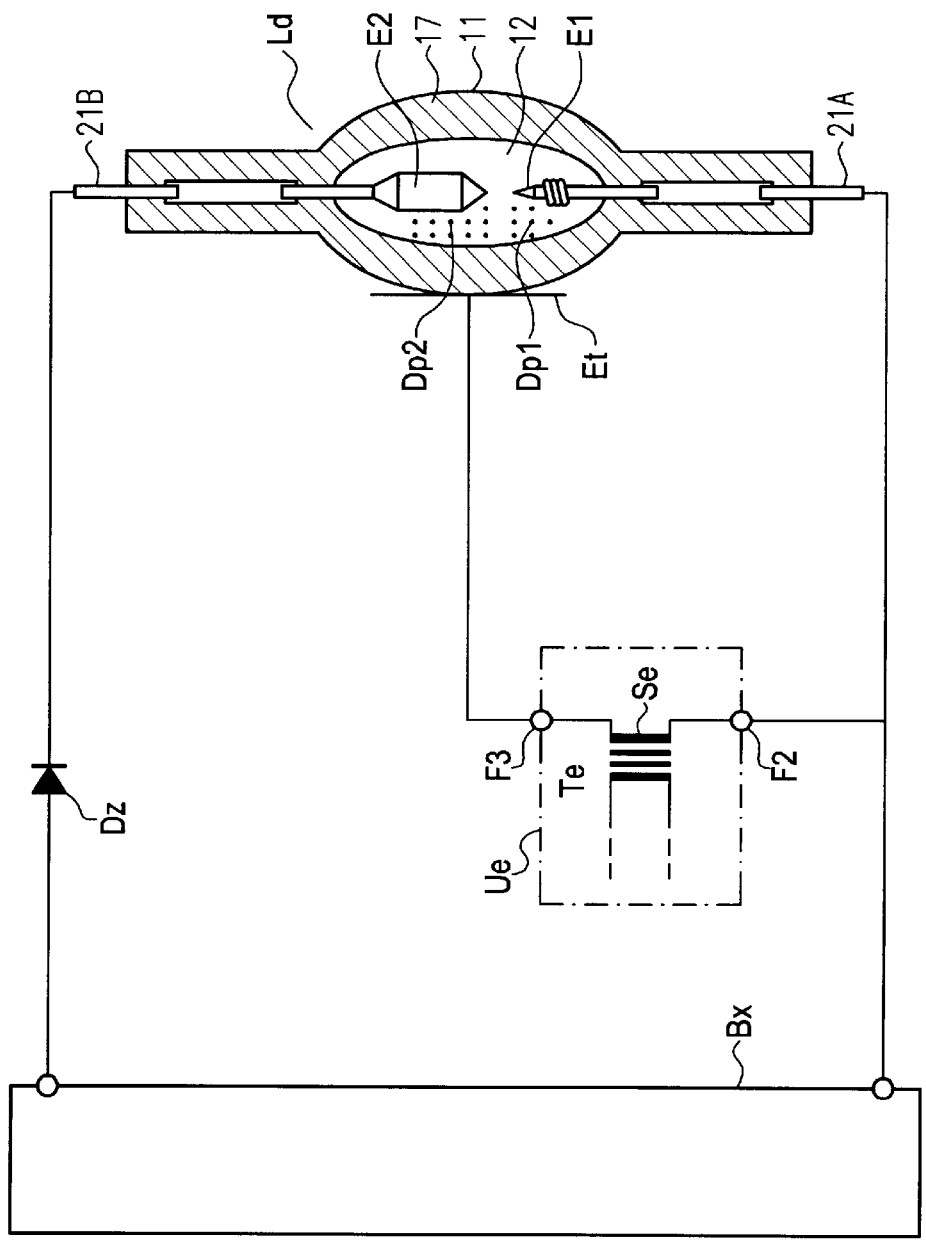
FIG. 3 shows a schematic of a dielectric barrier discharge which is formed between the discharge vessel and the electrodes as the two poles.

In the construction of the starter (Ue), it is especially advantageous to increase the peak value of the high voltage which forms in the secondary winding (Se) of the starter (Ue) in order to shorten the time for which a hot restart is impossible, as becomes apparent from FIG. 1. But this also increases the possibility of the formation of an insulation breakdown in an unintended area. Therefore, it is advantageous to increase this peak value as much as possible within the area which lies within the upper limit of the breakdown voltage in accordance with the dielectric resistance which the high voltage transformer (Te) of the starter (Ue) can have, the dielectric resistance which the wire path between one end of the secondary winding (Se) and the auxiliary electrode (Et) of the discharge lamp should have, or with the creepage distance between the auxiliary electrode (Et) of the discharge lamp (Ld) and the outer lead pins (21A, 21B) that provide electrical connection to the main discharge electrodes (E1, E2).

Generally the voltage on the secondary side of a transformer can be roughly estimated by multiplying the voltage on the primary side by the winding ratio of the primary winding to the secondary winding. In this case, as was described above, the voltage on the secondary side is a pulse. The waveform of the voltage which forms in the secondary winding (Se) is therefore influenced by the quadrature inductance of the high voltage transformer (Te) and by the parasitic electrostatic capacitance. It is therefore advantageous to determine the winding number of the secondary winding (Se) of the high voltage transformer (Te) according to production specimens of the secondary windings with different winding numbers.

FIG. 4 illustrates using an inverting chopper feed circuit (Bx). But in the case in which the no-load voltage applied to the discharge lamp (Ld) is less than or equal to the voltage of the DC source (Mx), a voltage reduction, chopper feed circuit (Bx) shown in FIG. 5 can be used.

In the feed circuit (Bx), using a switching device (Qx), such as a FET or the like, the current from the DC source (Mx) is turned on or off, and a smoothing capacitor (Cx) is charged via a choke (Lx). A gate signal with a suitable pulse duty factor from a gate driver circuit (Gx) is delivered to the switching device (Qx) such that the discharge current flowing between the main discharge electrodes (E1, E2) of the discharge lamp (Ld), the voltage between the main discharge electrodes (E1, E2) or the lamp wattage as the product of this current and this voltage has a suitable value which corresponds to the instantaneous state of the discharge lamp (Ld).

Normally, for suitable control of the lamp current, the lamp voltage, or the lamp wattage there is a voltage divider or shunt resistor for determining the voltage of the smoothing capacitor (Cx) and the current supplied by the smoothing capacity (Cx) to the discharge lamp (Ld). Furthermore, there is normally a control circuit which makes it possible for the gate driver circuit (Gx) to produce a suitable gate signal. They are however not shown in FIG. 5.

Figure 5:
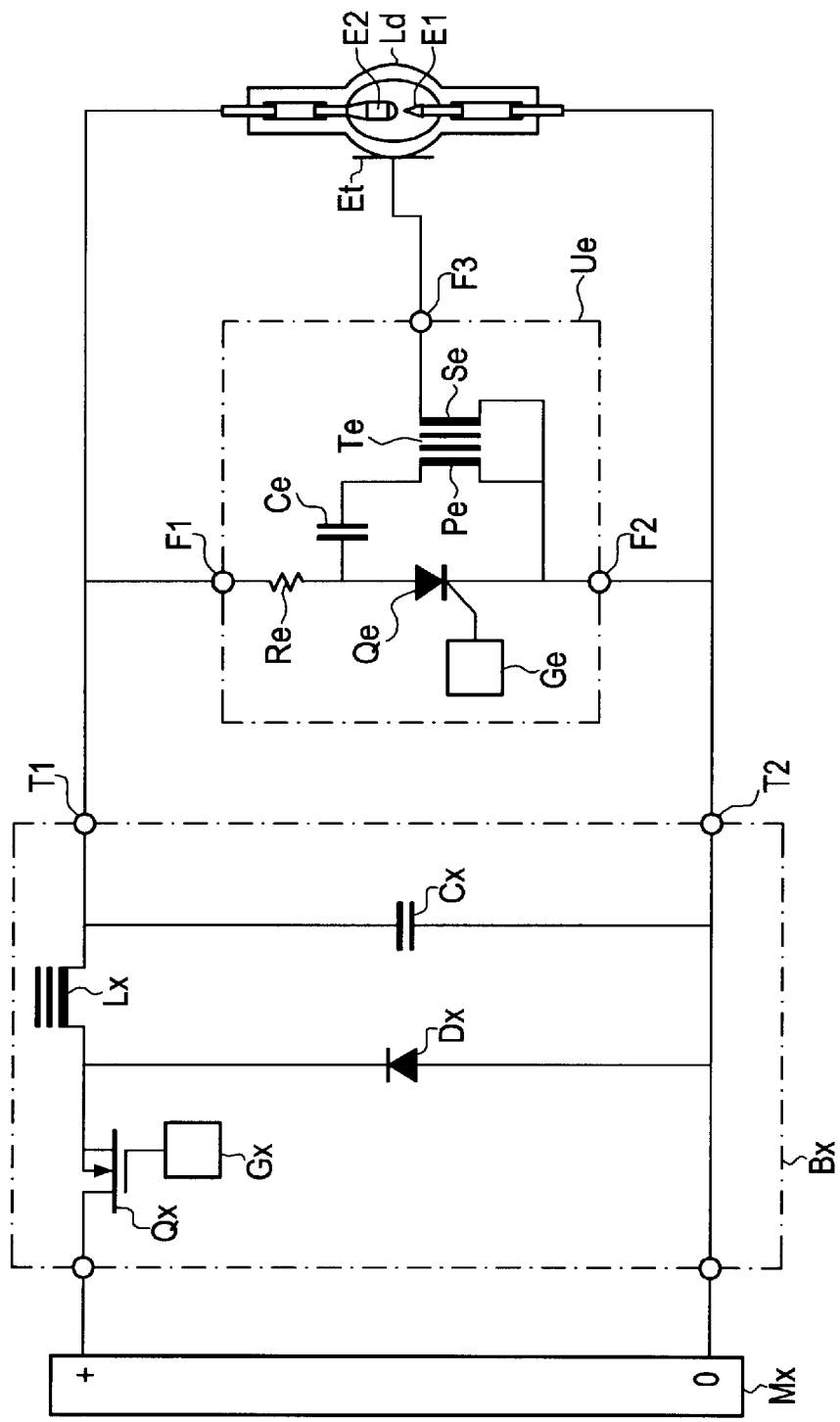
FIG. 5 shows a schematic of another embodiment of the invention using a voltage reducing chopper.

In FIG. 5 in the starter (Ue) as compared to FIG. 4 top and bottom are shown interchanged. The reason for this is the following.

In FIG. 4, a feed circuit (Bx) with an inverting chopper is used. The output point (T2') has a negative voltage if the output point (T1') is viewed as a reference. But since in FIG. 5 a voltage reduction chopper feed circuit (Bx) is used, the output point (T1) has a positive voltage if the output point (T2) is taken as the reference.

FIGS. 4 and 5 illustrate cases in which the high voltage of the starter is applied between the cathode side and the auxiliary electrode of the discharge lamp. But the high voltage can also be applied between the anode side and the auxiliary electrode of the discharge lamp.

Figure 6:
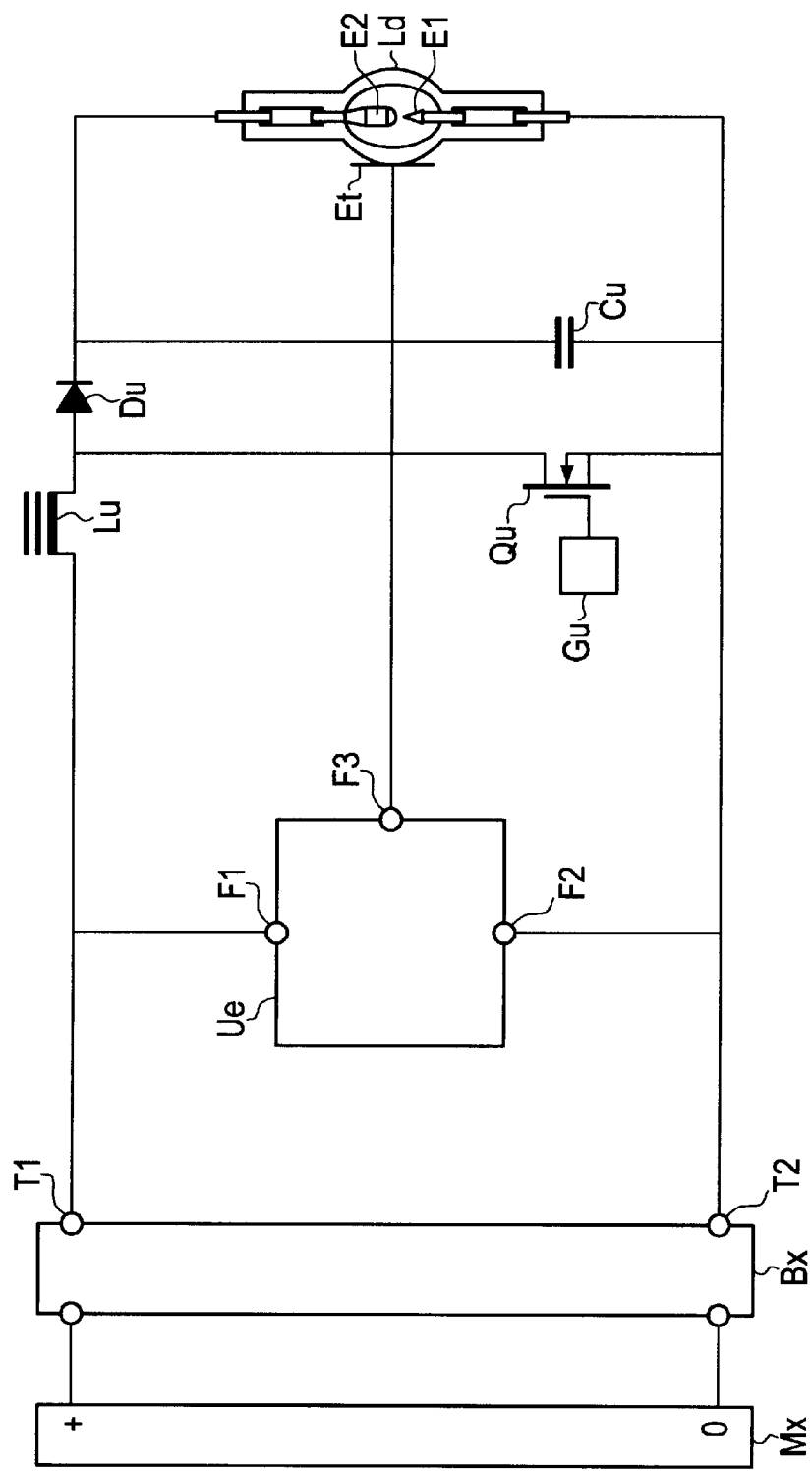
FIG. 6 shows a schematic of one embodiment of the light source device of the invention using a voltage reduction chopper and a set-up chopper.

FIG. 6 shows another embodiment of the invention. In the feed device shown in FIG. 6, compared to the feed device shown in FIG. 5, there is additionally a setup chopper circuit which comprises of a choke (Lu), a switching device (Qu), such as a FET or the like, a gate driver circuit (Gu) for controlling the switching device (Qu), a diode (Du) and a smoothing capacitor (Cu).

In the gate driver circuit (Gu), a current flows in the choke (Lu) by turning on the switching device (Qx) with a suitable time interval and suitable period thereby causing magnetic energy to be stored in the choke (Lu). If the switching device (Qu) is shifted into the OFF state, the stored magnetic energy is released by the inductive action of the choke (Lu). The electrical charge is loaded via the diode (Du) into the smoothing capacitor (Cu). In this way a higher voltage than the no-load output voltage of the feed circuit (Bx) can be applied to the main discharge electrodes (E1, E2).

For a general set-up chopper main circuit, the output voltage, as in the case illustrated in FIG. 6, of the smoothing capacitor (Cu) is determined using a voltage divider, or the like. The pulse duty factor of the gate driver circuit (Gu) is controlled by the feedback circuit such that for the determined voltage the error is reduced to the setpoint.

The same arrangement can be utilized in the present invention. But before starting only the discharge lamp (Ld) is connected to the set-up chopper circuit shown in FIG. 6. Very little current is delivered from the set-up chopper circuit. Moreover, since the starter (Ue) is operated immediately after operation of the set-up chopper circuit and after starting the discharge of the discharge lamp (Ld) it is not necessary to produce a no-load voltage. The set-up chopper circuit is therefore completely stopped.

Therefore, the device can be simplified compared to controlling with feedback of the output voltage, as in the case of a general set-up chopper main circuit. For example, from the gate driver circuit (Gu,) a pulse with a given time interval with a given period can be produced a given number of times, stopped and afterwards the starter (Ue) operated.

In this case it is desirable, for example, at the output of the set-up chopper circuit, as shown in FIG. 6, to protect the two ends of the smoothing capacity (Cu), such as with the addition of a protective element to protect against a voltage that exceeds an allowable value, such as by adding a varistor, or the like, in order to prevent the set-up chopper circuit during the next start attempt from being operated due to a failed start in the state in which the smoothing capacitor (Cu) is not discharged. This prevents the charging voltage of the smoothing capacitor (Cu) from becoming unduly large and prevents an insulation breakdown in an unintended area or damage of the smoothing capacitor (Cu) and the diode (Du).

Figure 7:
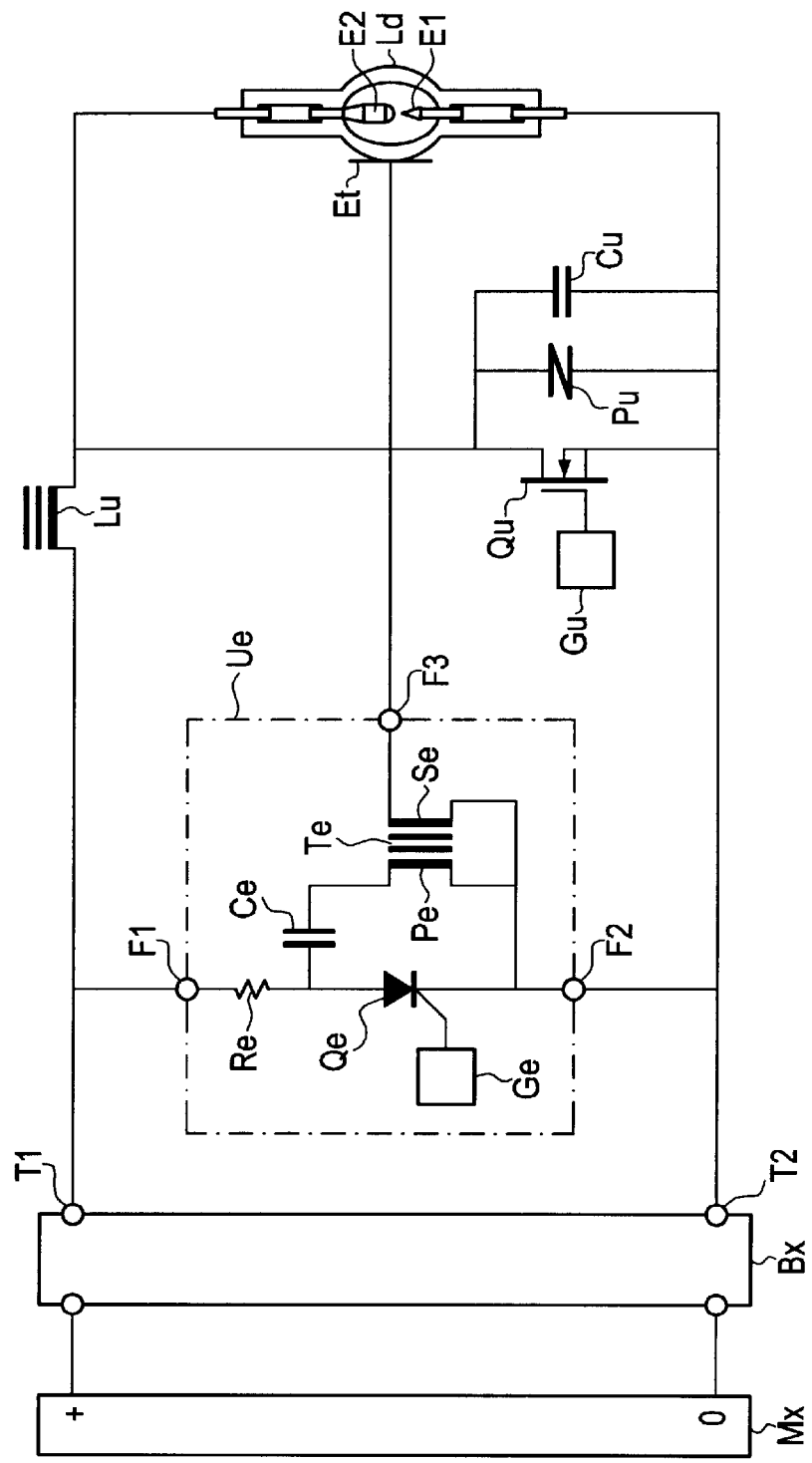
FIG. 7 shows a schematic of another embodiment of a light source device of the invention.

In FIG. 7 the light source device is similar to the light source device shown above in FIG. 6. The difference lies mainly in that the diode (Du) is not shown. Therefore a no-load voltage such as a DC no-load voltage, as in the case of a set-up chopper circuit, is not applied to the discharge lamp (Ld), but a pulse-like, high no-load voltage is applied to the discharge lamp (Ld). This voltage is formed immediately after the switching device (Qu) is shifted into the OFF state by the inductive action of the choke (Lu).

In the case in which the starter (Ue) produces a pulse-like high voltage, it is necessary for the duration for the formation of the high voltage by the starter (Ue) and the duration for the formation of the high voltage by the choke (Lu) to at least partially overlap with one another through synchronization.

Figure 8:
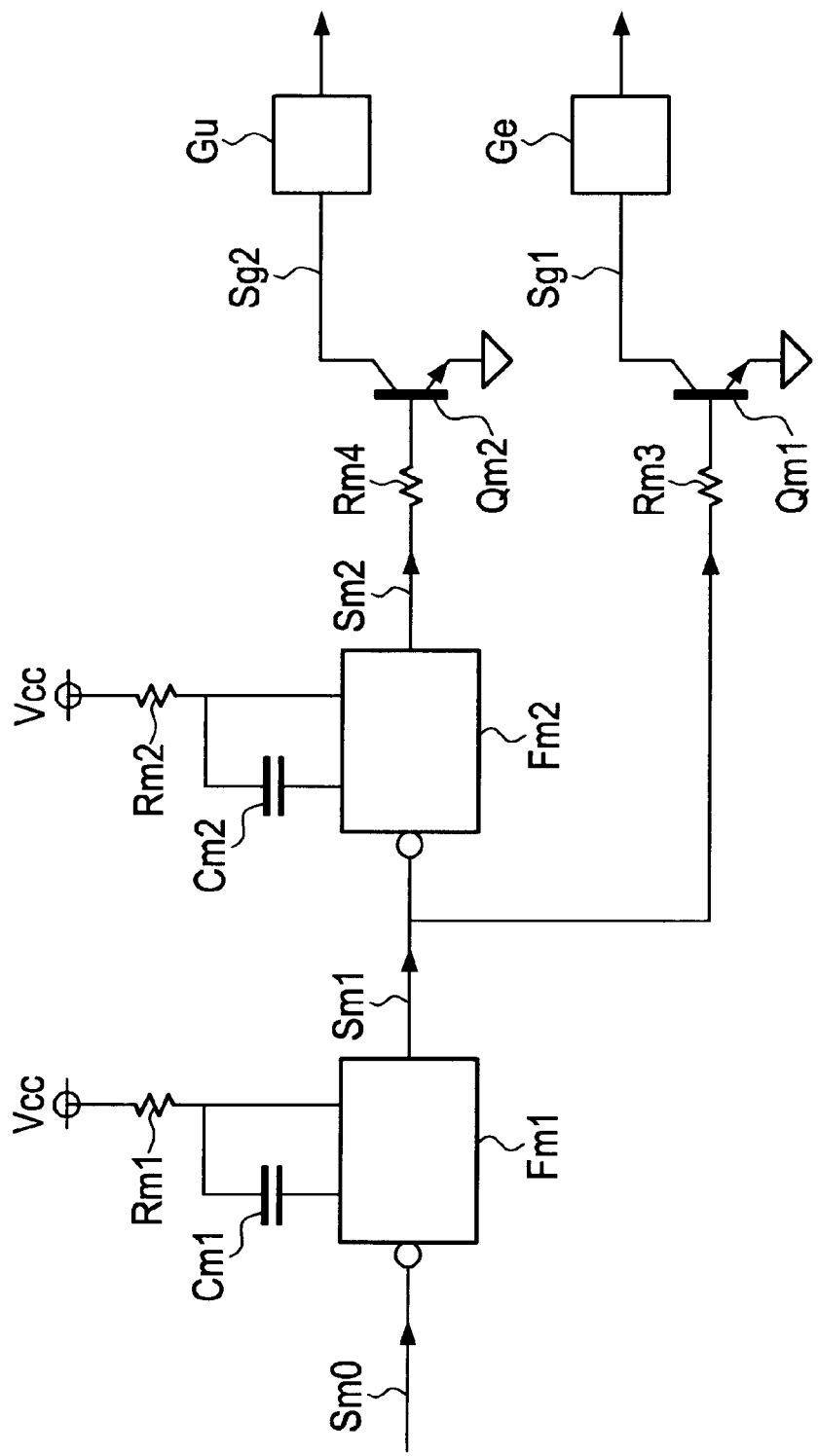
FIG. 8 shows a schematic of one embodiment of a control circuit of a pulse generating circuit as shown in FIG. 7.
Figure 9:
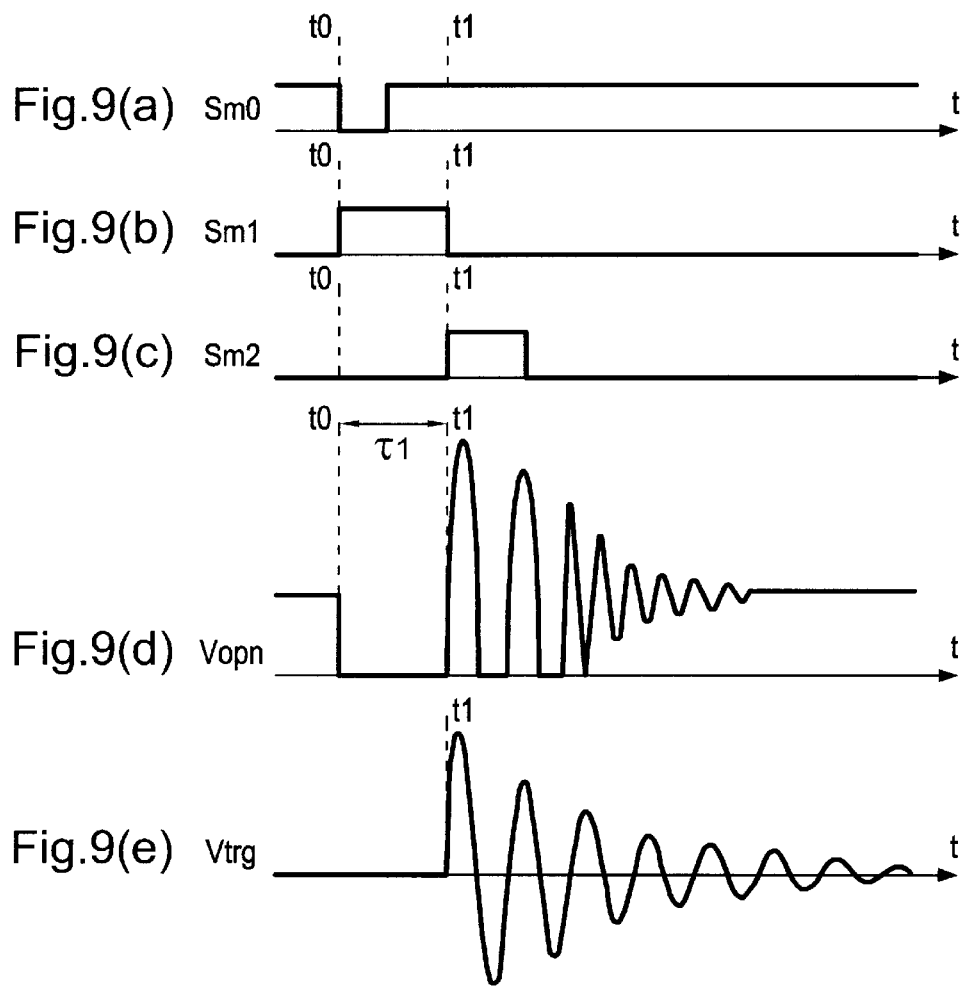
FIGS. 9(a) to 9(e) each show a schematic of one example of the waveform of the respective part of the light source device as claimed in the invention as shown in FIG. 7 of FIG. 8.

FIG. 8 shows an example of a circuit for producing signals (Sg1, Sg2) for a gate driver circuit (Ge) and a gate driver circuit (Gu) for the starter (Ue) which are used to produce the high voltages for the starter (Ue) and the choke (Lu) in synchronization. FIGS. 9(a) to 9(e) each show schematically the operation of this circuit. At time to, by inputting a start signal (Sm0) into a first monostable multivibrator (Fm1), the falling edge is determined, and according to a time constant determined by the resistor (Rm1) and the capacitor (Cm1), a pulse signal (Sm1) with a given time interval ($\tau$1) and a high level is produced. This state is shown in FIGS. 9(a) and 9(b). The generated pulse signal (Sm1) is input into a second monostable multivibrator (Fm2). Utilizing resistor (Rm3) the transistor (Qm1) is shifted into the ON state, the gate driver circuit (Gu) is activated and the switching device (Qu) is shifted into the ON state.

At time $t_1$ the pulse signal (Sm1) returns to a low level, the second monostable multivibrator (Fm2) determines the falling edge of the pulse signal (Sm1) and, according to a time constant which determined resistor (Rm2) and capacitor (Cm2), produces a pulse signal (Sm2) with a given time interval and a high level. This state is shown in FIG. 9(c). The generated pulse signal (Sm2) utilizing resistor (Rm4) shifts the transistor (Qm2) into the ON state, activates the gate driver circuit (Ge) and shifts the switching device (Qe) into the ON state.

During the interval during which the pulse signal (Sm1) is at a high level, a switching brake (Qu) is shifted into the ON state and magnetic energy is stored in the choke (Lu). When the pulse signal (Sm1) returns to a low level, the choke (Lu) releases the stored magnetic energy and produces a pulse-like, high no-load voltage for application to the electrodes (E1, E2). This state is shown in FIG. 9(d).

Almost simultaneously with the return of the pulse signal (Sm1) to a low level, the switching device (Qe) is shifted into the ON state. The charging voltage of the capacitor (Ce) is applied to the primary winding (Pe) of the high voltage transformer (Te), described above. In the secondary winding (Se) of the high voltage transformer (Te), a high voltage forms for application to the auxiliary electrode (Et) of the discharge lamp (Ld). This state is shown in FIG. 9(e).

In the transistors (Qm1, Qm2) there are delays. In a qualitative examination however, the effect of the delays has been ignored. To facilitate the description, the waveforms shown in FIGS. 9(d) and 9(e) show cases in which the discharge lamp is not connected and therefore no discharge phenomenon occurs. Specifically an IC, for example, SN74HC123 from Texas Instruments or the like can be used as the first monostable multivibrator (Fm1) and the second monostable multivibrator (Fm2).

In the light source device shown in FIG. 7, the diode is removed from the light source shown in FIG. 6. Therefore, there are the advantages that the loss due to the voltage in the forward bias direction of the diode (Du) during steady-state operation after starting does not occur and higher efficiency than in the light source device shown in FIG. 6 can be achieved.

Figure 10:
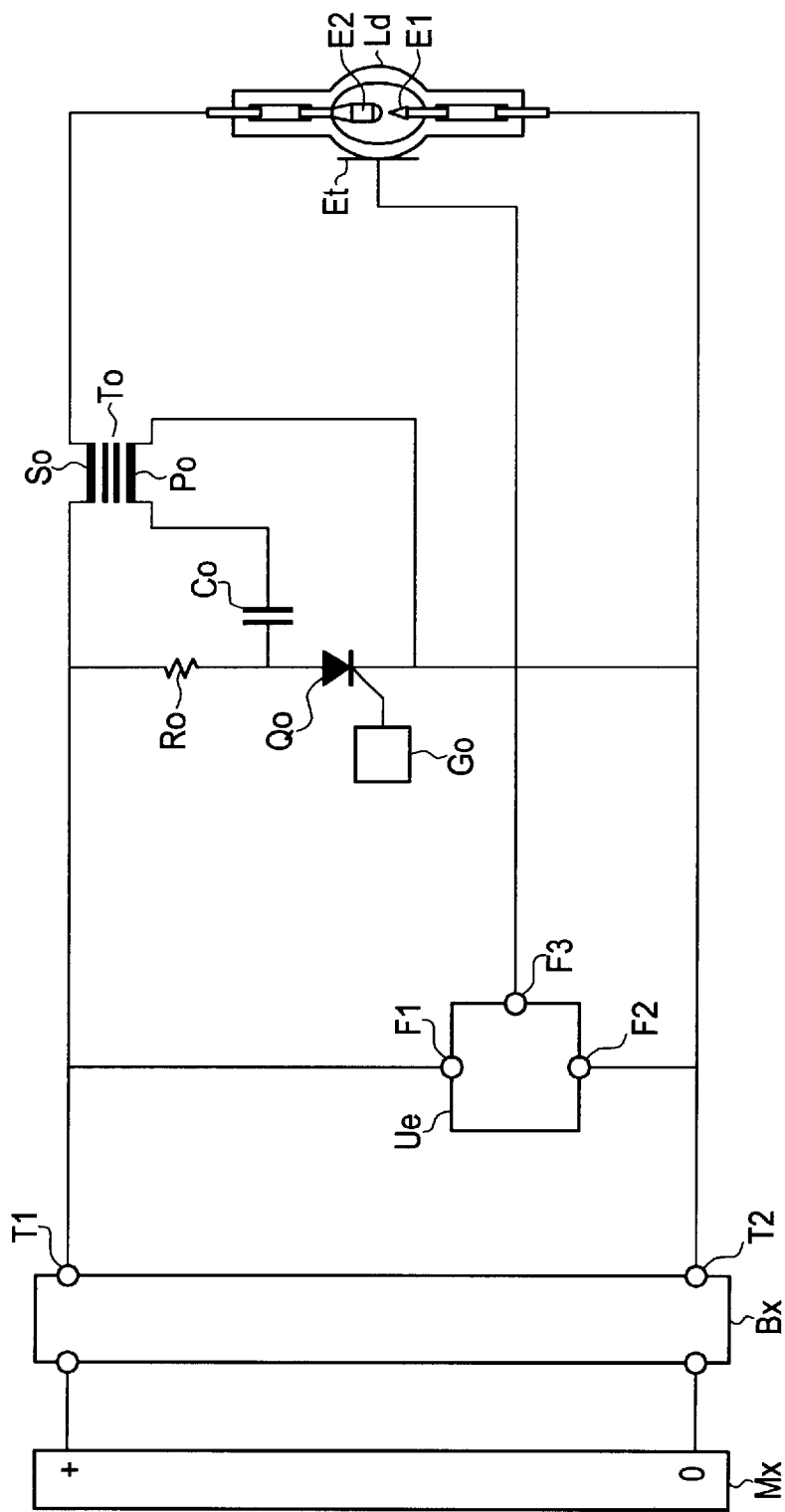
FIG. 10 shows a schematic of another embodiment of the light source device of the invention.

In the light source device of FIG. 10 the choke (Lu) described above in relation to FIG. 7 has been replaced by the secondary winding (So) of a transformer (To).

A capacitor (Co) is charged via resistor (Ro). By closing the switching device (Qo), such as a SCR thyristor or the like, via a gate driver circuit (Go) with suitable timing, the charging voltage of the capacitor (Co) is applied to the primary winding (Po) of the high voltage transformer (To). Therefore, in the secondary winding (So) of the high voltage transformer (To), an elevated voltage is formed which corresponds to the high voltage transformer (To). Thus, a pulse-like, high no-load voltage for application to the electrodes (E1, E2) can be accomplished.

It is desirable to control the timing of the operation the switching devices (Qo) and (Qe) at the starter (Ue) such that the time during which a restart is impossible becomes shortest under hot restart conditions. But in practice there are many cases in which it is proper if the two are operated at the same time. There are therefore also cases in which a common control signal can be used as the control signal for the gate driver circuit (Go) and for the switching device (Qe). Hence there is the advantage that the arrangement of the device is simplified.

In this case, by the resistor (Ro), the capacitor (Co) and the switching device (Qo) being omitted, and the primary winding (Pe) of the high voltage transformer (Te) of the starter (Ue) and the primary winding (Po) of the transformer (To) being connected in series or parallel to one another, it is possible for the driver circuit for the starter (Ue) to also drive the transformer (To). In this way, additional simplification is possible.

Since in the light source device shown in FIG. 10, the diode (Du) which is present in FIG. 6 is not present, there are the advantages that the loss as a result of the voltage of the forward bias direction of the diode (Du) during steady-state operation after starting does not occur and that higher efficiency in the light source shown in FIG. 6 can be achieved.

Figure 11:
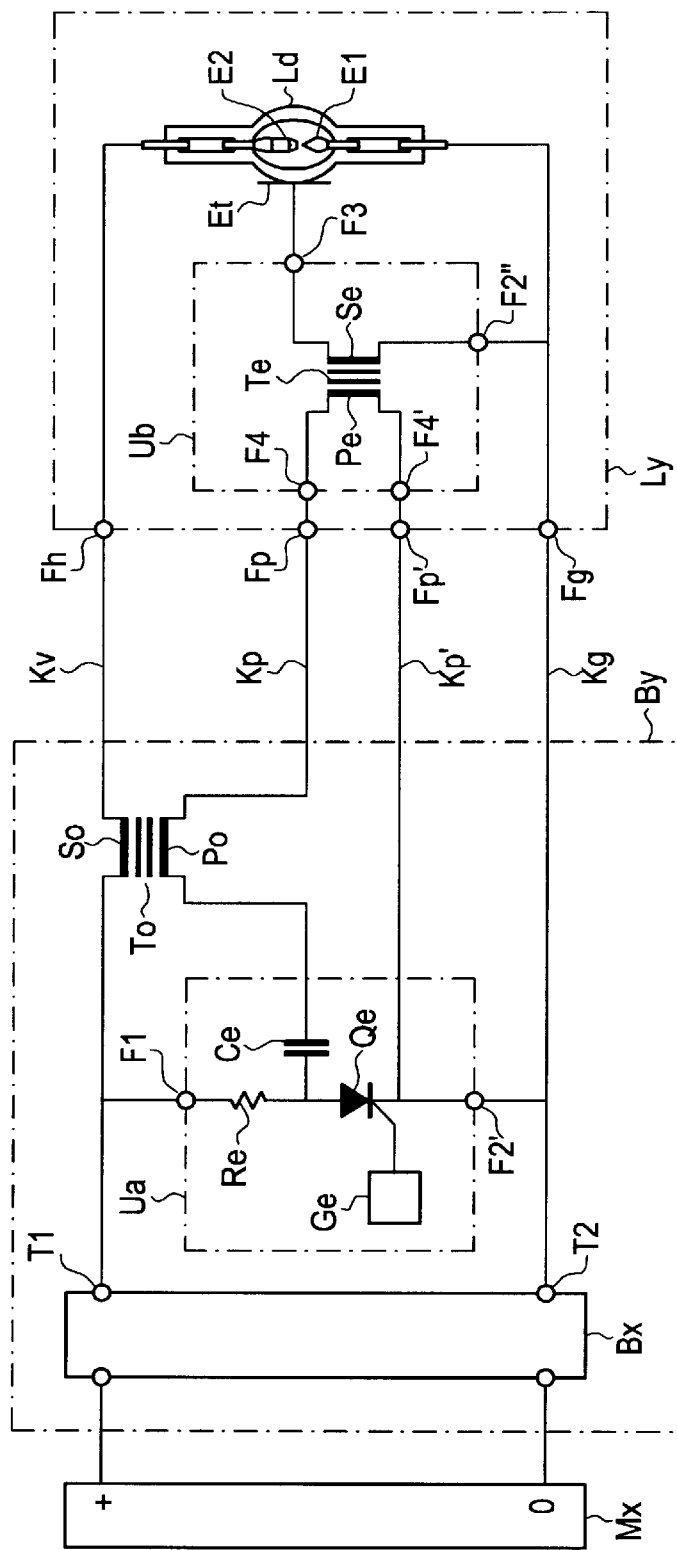
FIG. 11 shows a schematic of still another embodiment of the light source device of the invention.

In FIG. 11, the starter comprises a starter-transformer driver circuit part (Ua) and a high voltage generating part (Ub) which have been formed by dividing the starter (Ue) described above in relation to FIG. 4. The high voltage generating part (Ub) is located separately from the feed circuit part (By).

The connecting wire between the feed circuit (By), the high voltage generating part (Ub) and the discharge lamp (Ld) has a far lower voltage, while the line between the output point (F3) of the starter (Ue) described above in relation to FIG. 4 and the auxiliary electrode (Et) of the discharge lamp (Ld) transfers a high voltage pulse. The fear that an adverse effect will be increased by lengthening this connecting wire, i.e., the possibility of noise or the formation of an insulation breakdown in an unintended area, is therefore small.

Here, the ground point (F2) of the starter (Ue) is divided into the ground point (F2') of the starter-transformer-driver circuit part (Ua) and the ground point (F2") of the high voltage generating part (Ub). Feed into the primary winding (Pe) of the high voltage transformer (Te) is carried out via line paths (Kp, Kp') and over line paths (Kv, Kg) to the electrodes (E1, E2).

Due to this measure, the current of the primary winding (Pe) of the high voltage transformer (Te) flows only in the line paths (Kp, Kp'), by which a balanced circuit is obtained. Thus, noise and malfunctions are suppressed. By twisting the line paths (Kp, Kp'), the action of suppressing the noise can be increased even more. Furthermore, the noise caused by the surge current which flows from the smoothing capacitor (Cx) into the discharge lamp (Ld) when the main discharge is started, for example, is suppressed by the line paths (Kv, Kg) which can also be twisted.

In this embodiment, as was described above, the primary winding (Po) of the transformer (To) for a pulsed increase of the no-load voltage and the primary winding (Pe) of the high voltage transformer (Te) of the starter (Ue) are series connected to the main discharge electrodes (E1, E2) and the two transformers are driven at the same time by the starter-transformer driver circuit part (Ua).

Figure 12:
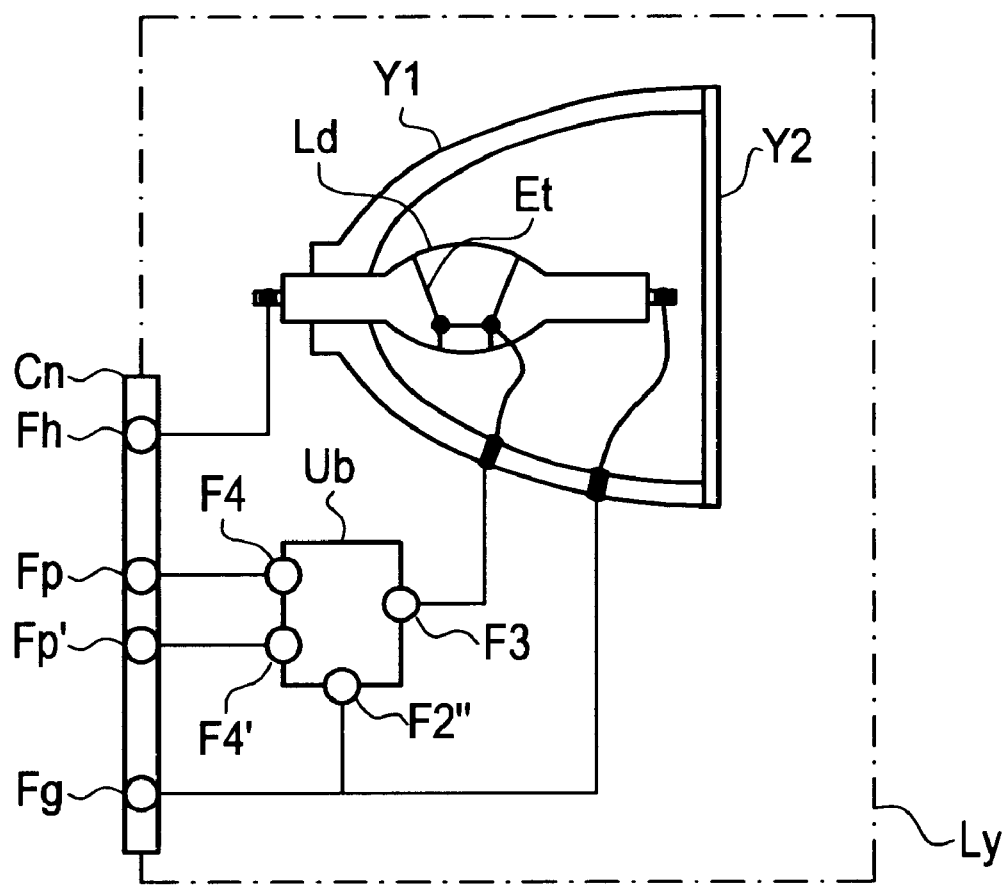
FIG. 12 shows a schematic of one embodiment of a lamp unit of the light source device of the invention.

In FIG. 12 a state is shown in which the discharge lamp (Ld) and the high voltage generating part (Ub) of the starter are formed integrally with one another and are arranged as a lamp unit (Ly). The lamp unit (Ly), comprises a reflector (Y1) that directs the emissions from the discharge lamp, a light exit window (Y2) which covers the front of the reflector (Y1), and a connector (Cn) for electrical connection of the feed circuit part (By) to the lamp unit (Ly).

Figure 13:
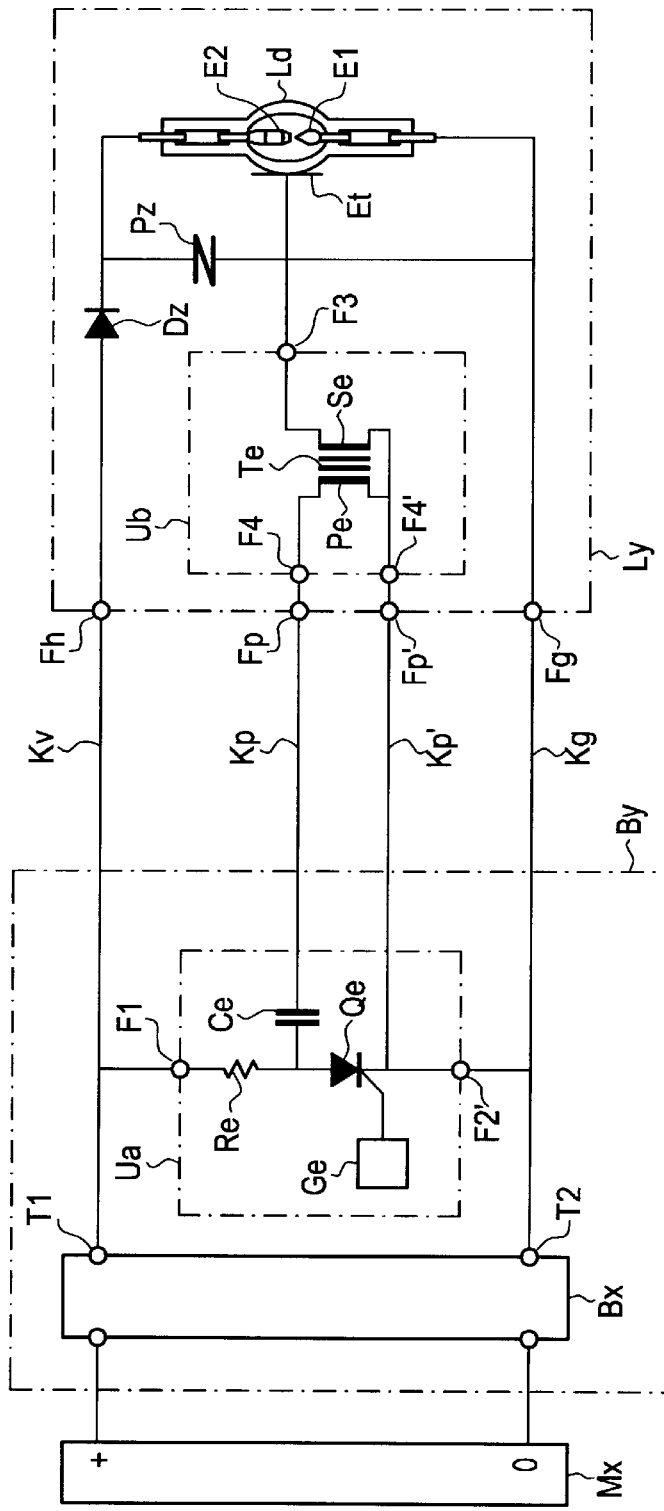
FIG. 13 shows a schematic of another embodiment of the light source device of the invention.

In FIG. 13 the high voltage generating part (Ub) is, as in the embodiment shown in FIG. 11, arranged separately from the feed circuit part (By). As was described above, there is a diode (Dz) in the vicinity of the discharge lamp (Ld) which is used for loading the electrical charge provided by the dielectric barrier discharge onto the electrode (E2) for the main discharge on the side to which the other end of the secondary winding (Se) of the high voltage transformer (Te) is not connected and which is used to feed the no-load voltage as high voltage to the electrodes (E1, E2) as the two poles for the main discharge by this charging of the high voltage.

Furthermore, to prevent destruction of the diode (Dz) in the case of an increased charging voltage of the electrode (E2) a protective element varistor (Pz) is inserted parallel to the electrodes (E1, E2).

Figure 14:
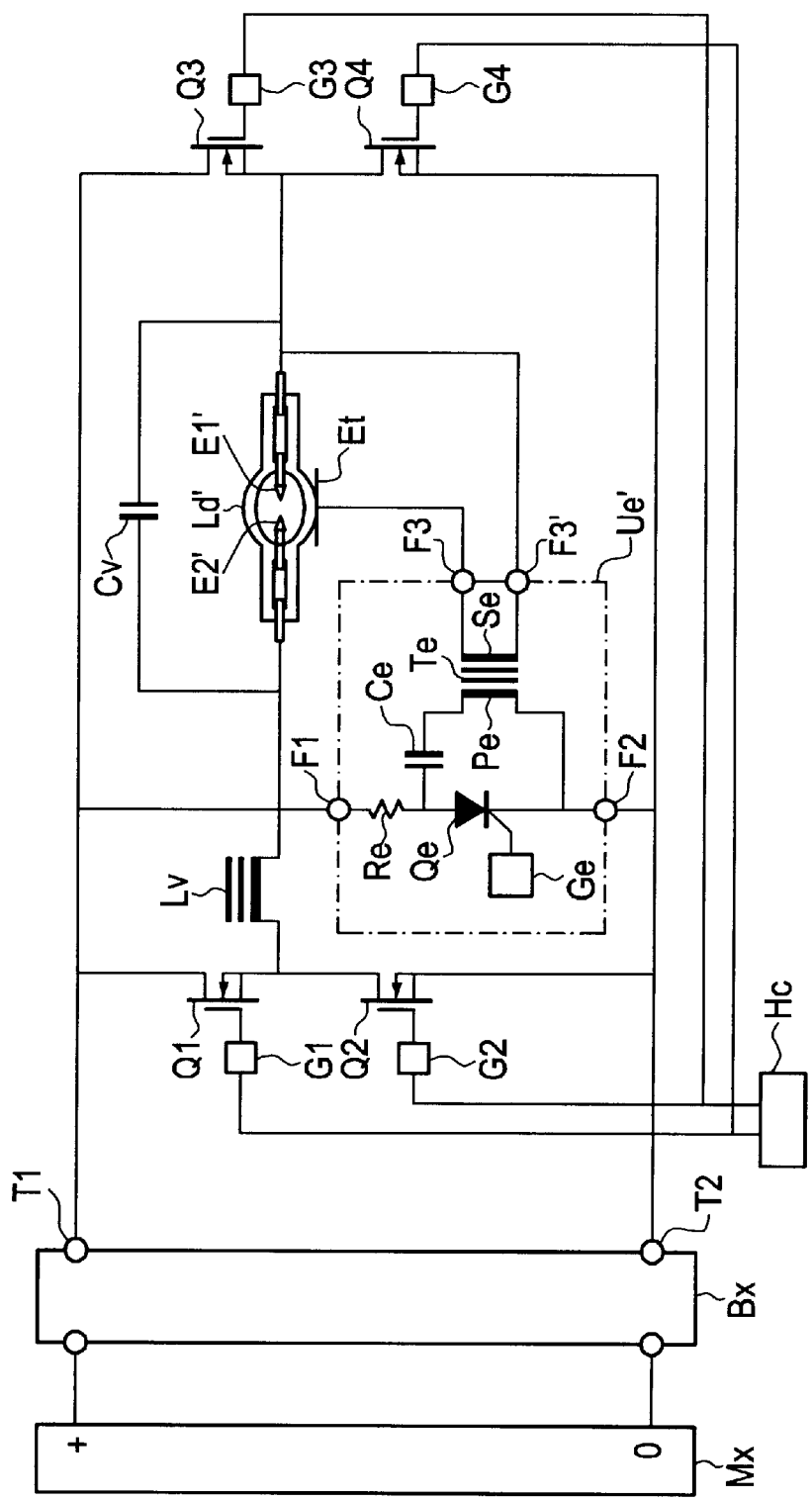
FIG. 14 shows a schematic of one embodiment of a light source device of the AC operating type.

FIG. 14 shows another embodiment of the invention in a simplified representation. In this circuit there are additional switching devices (Q1, Q2, Q3, Q4), such as FETs or the like, and thus a full bridge inverter is formed. In this way an AC discharge voltage can be applied to the discharge lamp (Ld').

The switching devices (Q1, Q2, Q3, Q4) are each driven by gate driver circuits (G1, G2, G3, G4) which are each controlled by a full bridge inverter control circuit (Hc) such that the switching devices (Q1, Q4) and switching devices (Q2, Q3) which are each the diagonal elements of the full bridge inverter are closed at the same time.

The starter (Ue') is identical to the starter (Ue) shown above using FIG. 5. For the starter (Ue) shown above using FIG. 5, one end of the secondary winding (Si) is connected to the ground point (F2), while for the starter (Ue') it is connected directly as the output point (F3') to the line of one electrode (E1') of the discharge lamp (Ld').

The high voltage which forms at the output points (F3, F3') of the starter (Ue') is applied between one electrode (E1') of the lamp (Ld') and the auxiliary electrode (Et). Between the electrode (E1') and the inside of the discharge vessel (11) of the lamp (Ld'), a discharge forms due to dielectric barrier discharge, by which the discharge lamp is started.

Since there is a capacitor (Cv) parallel to the discharge lamp (Ld') and since a coil (Lv) is connected in series to both, for the capacitor (Cv), i.e., for the discharge lamp (Ld'), by setting the operating frequency of the full bridge inverter to a value which has approached the resonant frequency of an LC resonant circuit formed by the capacitor (Cv) and the coil (Lv), due to resonance a high AC voltage forms. Thus, between the electrodes (E1, E2) a high no-load voltage can be applied.

If it is possible for the timing of the switching of the closed states of the switching devices (Q1, Q2, Q3, Q4) of the full bridge inverter and the formation of the high voltage of the starter (Ue) to be unfavorable with respect to discharge starting of the discharge lamp, this disadvantage with respect to the timing with regard to discharge starting of the discharge lamp can be avoided either by synchronization such that the timing of the switching of the closed states of the switching devices (Q1, Q2, Q3, Q4) and the formation of the high voltage of the starter (Ue) becomes correct, or by stopping operation of the full bridge inverter until termination of discharge starting of the discharge lamp.

In the embodiment of the invention a case was described in which the starter was one which produces mainly a high voltage pulse, as for example the starter (Ue) described above illustrated in FIG. 4 or 5. But the starter (Uf) shown in FIG. 15 can be used which is called a "DC starter" and which produces a high voltage at which the voltage increases relatively slowly.

The input point (F1) and the ground point (F2) of the starter (Uf) are connected like the input point (F1) and the ground point (F2) of the starter (Ue) in the embodiments shown in FIGS. 4 and 5 to the output points (T1', T2') of the feed circuit (Br) and the output points (T1, T2) of the feed circuit (Bx), and the required voltage is also supplied to the starter (Uf).

When this voltage is received, in the starter (Uf) charging of the capacitor (Cf1) is begun via the resistor (Rf). Closing of this switching device (Qf), such as a SIDAC or the like, takes place by itself when the voltage of the capacitor (Cf1) is charged up to a given threshold voltage. This voltage is applied to the primary winding (Pe) of the high voltage transformer (Tf). Via a diode (Df) which is connected to the secondary winding (Se) a capacitor (Cf2) on the secondary side is charged. If the discharging of the capacitor (Cf1) on the primary side continues and if the current reaches a value which is less than or equal to a given value, the switching device (Qf) is shifted by itself into the unclosed state. Thus, the charging of the capacitor (Cf1) is restarted. Each time the capacitor (Cf1) is charged or discharged the charging of the capacitor (Cf2) on the secondary side accumulates, which continues to increase.

When one end of the capacitor (Cf2) is connected to the electrode (E1) of the discharge lamp (Ld) and the other end of the capacitor (Cf2) is connected to the auxiliary electrode (Et) which is located outside the discharge vessel (11) of the discharge lamp (Ld), and when the voltage of the capacitor (Cf2) reaches the ignition voltage, between one electrode (E1) and the inside of the discharge vessel (11) of (Ld) a discharge is formed by the dielectric barrier discharge.

When this discharge has taken place, the discharge lamp has been started and when a transition to the arc discharge has successfully taken place, the voltage of the discharge lamp (Ld) decreases, i.e., as a result the voltage supplied to the starter (Uf) also decreases, and the charging voltage of the capacitor (Cf1) drops and the switching device (Qf) is shut down.

Figure 16:
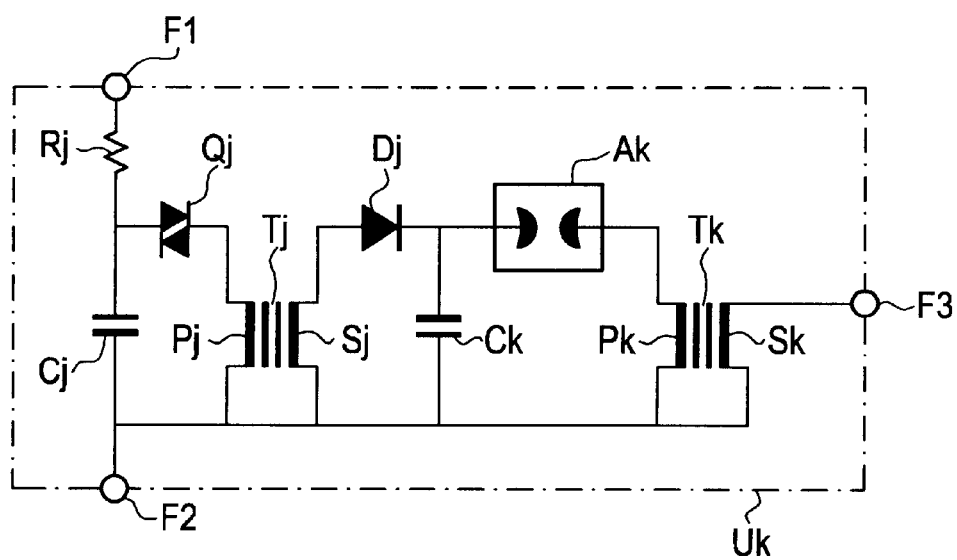
FIG. 16 shows a schematic of one example of a two-stage set-up starter which can be used for the invention.

In this embodiment of the invention a case has been described in which the starter is one which has mainly a step-up transformer and is called a "starter of the single-stage voltage raising type", such as for example the starter (Ue) described above using FIG. 4 or FIG. 5. However, the starter (Uk) shown in FIG. 16 can also be used. The starter (Ub) has two set-up transformers and is called a "starter of the single-stage voltage raising type", however any device which produces a high voltage can be used.

Figure 17:
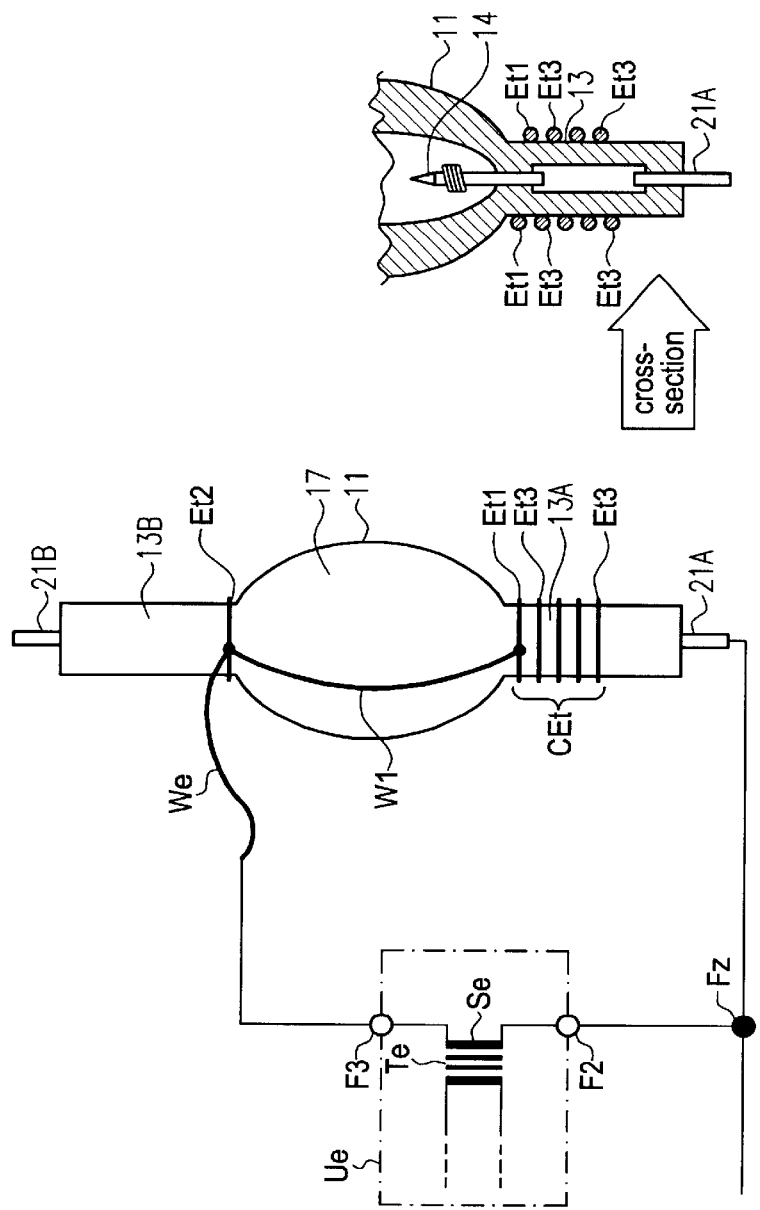
FIG. 17(a) shows a partial view of the appearance of one embodiment of a discharge lamp as claimed in the invention.
FIG. 17(b) shows a partial view of one embodiment of a discharge lamp as claimed in the invention in cross section.
Figure 18:
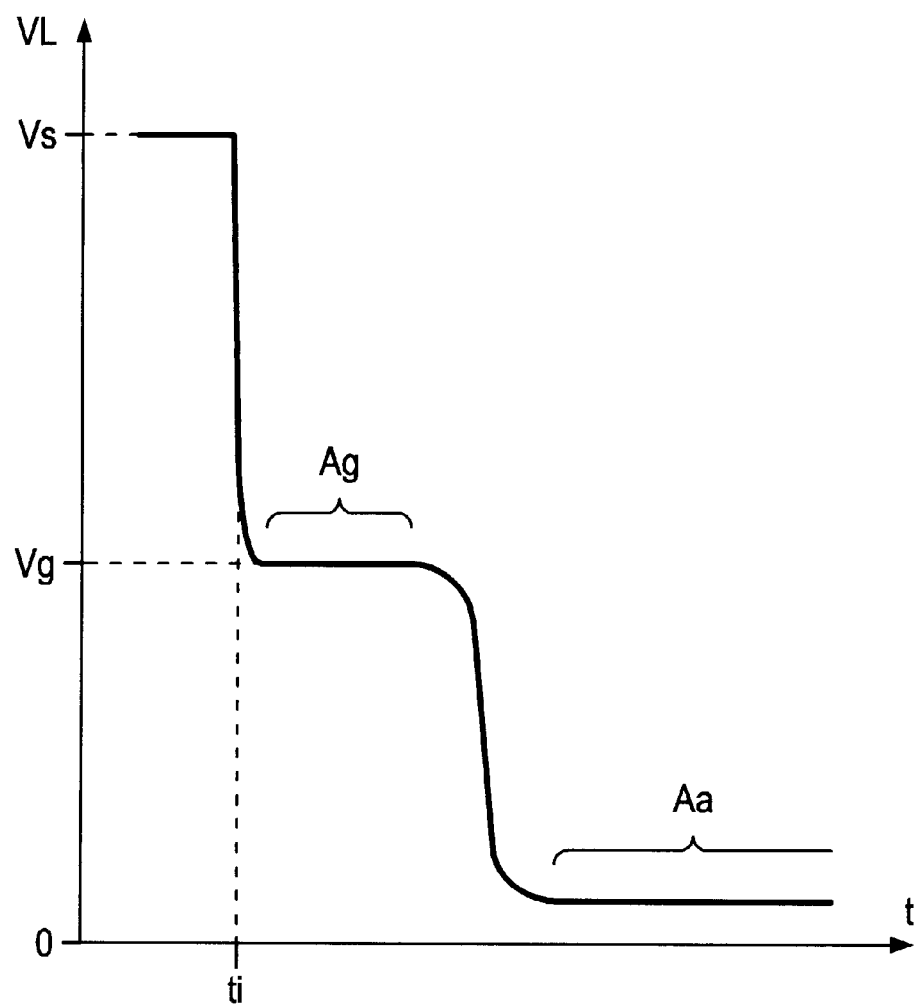
FIG. 18 shows a schematic of the lamp voltage waveform when the discharge lamp is started.
Figure 19:
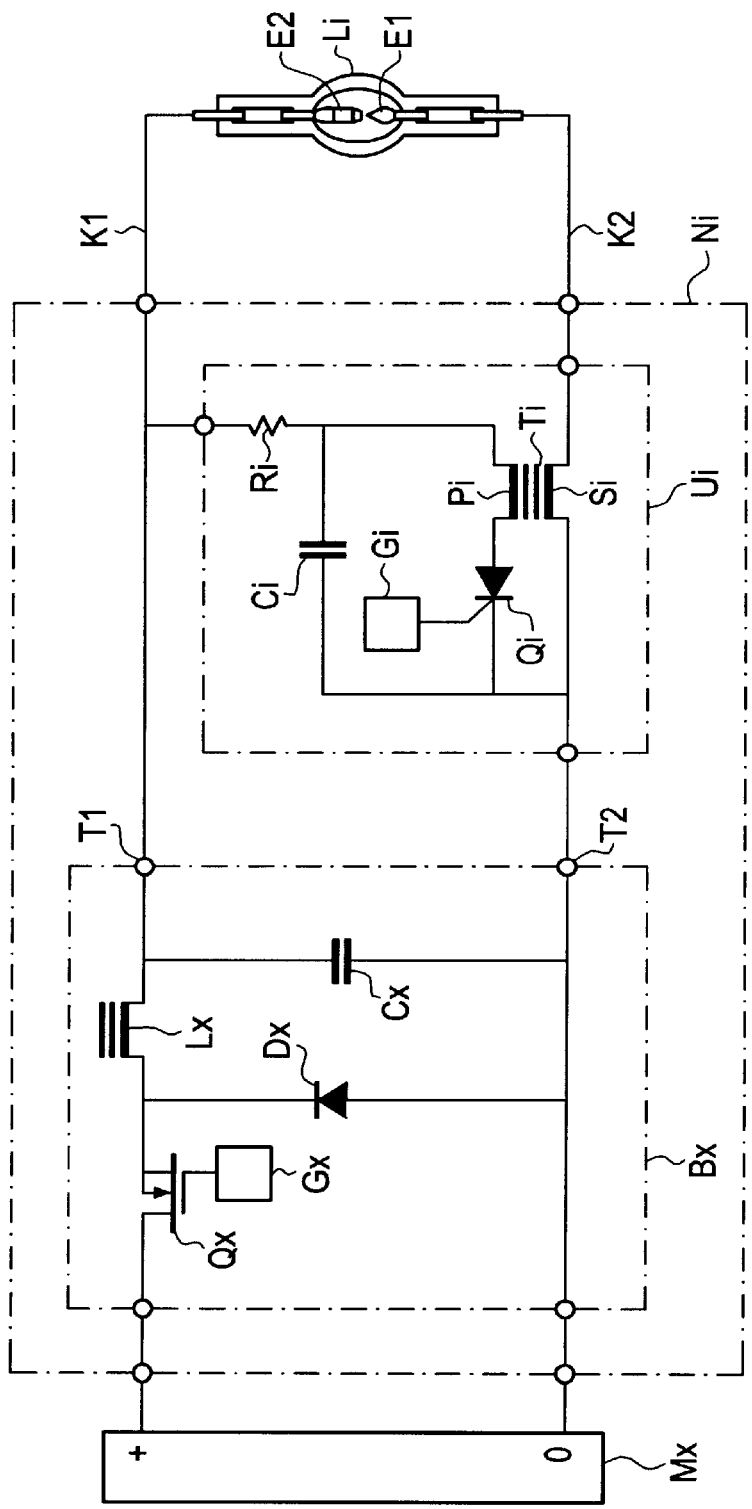
FIG. 19 shows a schematic of the arrangement of a conventional light source device.

FIGS. 17(a) and 17(b) each show one embodiment of the discharge lamp of the invention. In this embodiment an outer lead pin (21A) on the cathode side of the discharge lamp (Ld) is connected to the ground point (F2) of the starter (Ue) and the ground point (T2) of the feed circuit (Bx). The outer lead pin (21B) on the anode side is connected to the positive output point (T1) of the feed circuit (Bx).

On the other hand, the auxiliary electrode (Et) comprises of a conductive wire (Et1) and a conductive wire (Et2). The conductive wire (Et1) on the hermetically sealed portion (13A) on the cathode side is wound around an area which is in the vicinity of the area (17) which surrounds the discharge space. The conductive wire (Et2) on the hermetically sealed portion (13B) on the anode side is wound around an area which is in the vicinity of the area (17) which surrounds the discharge space. The conductive wire (Et1) and conductive wire (Et2) are connected to one another by a conductive wire (W1), formed electrically integrally, and furthermore connected via a conductive wire (We) to the output point (F3) of the starter (Uc).

The advantage of one such arrangement is the following:

The peripheral length of the conductive wire (Et1) and of the conductive wire (Et2) is shorter than the peripheral length of the arch of the outside shape of the area (17) which surrounds the discharge space. Therefore the conductive wire (Et1) or conductive wire (Et2) is prevented from moving in the direction in which it approaches the arch of the outside shape of the area (17) which surrounds the discharge space. Furthermore, since the conductive wire (Et1) and the conductive wire (Et2) are interconnected by the conductive wire (W1), they are prevented from moving apart from one another. The conductive wire (Et1) and the conductive wire (Et2) can therefore always maintain a state in which they are stably located at given locations, even if there are repeated thermal expansions and contractions or vibrations of the respective part due to the thermal cycling of turning the discharge lamp on or off.

The reason why one such arrangement functions advantageously as an auxiliary electrode (Et) is the following:

The conductive wire (Et1) and the conductive wire (Et2) are wound around the hermetically sealed portions (13A, 13B) in the vicinity of the area (17). The glass in the hermetically sealed portions (13A, 13B) of the area (17) is therefore largely polarized by the high voltage of the starter (Ue). Since in the hermetically sealed portions (13A, 13B) of the area (17), the cathode conductor and the anode conductor touch one another, i.e., are in contact with one another, or have a very small distance to one another, between the hermetically sealed portion (13A) on the cathode side of the area (17), and the cathode conductor and between the hermetically sealed portion (13B) on the anode side of the area (17) and the anode conductor, a strong dielectric barrier discharge forms.

The conductive wire (W1) which interconnects the conductive wire (Et1) and the conductive wire (Et2) may or may not be in contact with the area (17). The respective winding number of the conductive wire (Et1) and of the conductive wire (Et2) can be 1 or greater than or equal to 2.

In FIGS. 17(a) and 17(b), in addition to the conductive wire (Et1), a conductive wire (Et3) is wound such that it surrounds the hermetically sealed portion (13A) on the cathode side. The conductive wire (Et1) and the conductive wire (Et3) overall form a coil (CEt).

Since the output point (F3) and the ground point (F2) of the starter (Ue) are connected to the two ends of the secondary winding (Se) of the high voltage transformer (Te), during the interval for which the starter (Ue) is not in operation, especially during operation after completion of the starting of the discharge lamp, no voltage forms between the output point (F3) and the ground point (F2) of the starter (Ue).

As was described above, the outer lead pin (21A) on the cathode side is connected to the ground point (F2) of the starter (Ue). Therefore, during operation, in the line between the outer lead pin (21A) on the cathode side and the ground point (T2) on the feed circuit (Bx) a state is maintained in which one connection point (Fz) in which the starter (Ue) is connected to the ground point (F2), and the coil (CEt) is arranged such that it surrounds the hermetically sealed portion (13A) on the cathode side, and has same electrical potential.

During operation of the discharge lamp (Ld), in the path from the tip of the cathode (14) to the outer lead pin (21A) on the cathode side to as the connecting point (Fz), the main discharge current of the discharge lamp (Ld) flows and a voltage reduction occurs which is proportional to the product of the resistance value of this path and the flowing current. The electrical potential increases the more the more the tip of the cathode (14) is approached.

Since the connection point (Fz) and the coil (CEt) have the same electrical potential, as was described above, the cathode, especially in the vicinity of the hermetically sealed portion (13A) thereof, has a higher electrical potential than the coil (CEt) which surrounds it.

As is described in Japanese patent HEI 4-40828, therefore in the discharge vessel (11) of the discharge lamp having a high temperature in the operating state in areas in the vicinity of the hermetically sealed portions (13), metal cations of impurities which are contained in the material of the discharge vessel (11) are moved in the direction in which they move away from the electrode material comprising the cathode. This prevents the phenomenon that by accumulation of the metal cations of impurities on the surface of the electrode material the glass material of the hermetically sealed portions of the discharge vessel, such a silica glass or the like, and the electrode material detach from one another. The disadvantage of damage to the discharge lamp as a result of the detachment phenomenon can be prevented beforehand by the arrangement of the discharge lamp described above using FIGS. 17(a) and 17(b).

The entire region of the conductive wires (Et1, Et2, Et3, W1, We) which form the auxiliary electrode and the coil can be formed only from a single conductive wire without joining the individual wires together, for example, by the conductive wire for the connection (We), the conductive wire (Et1) on the side of the hermetically sealed portion (13A) on the cathode side, the conductive wire (W1) for the connection and the coil (CEt) being wound around the lamp in this sequence. Feasibly, the material for the conductive wire is a material with high thermal resistance such as tungsten or the like, because the discharge vessel (11) and the hermetically sealed portions (13A, 13B) reach a high temperature during operation of the discharge lamp.

Figure 15:
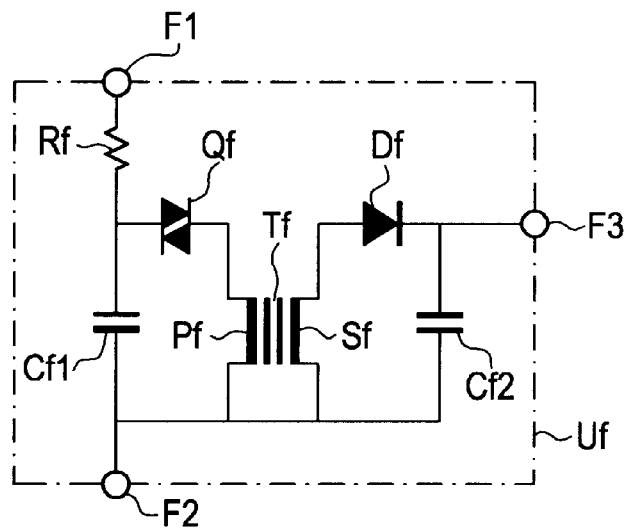
FIG. 15 shows a schematic of one example of the DC starter which can be used for the invention.

Also, in the case described in relation to FIG. 15, the output point (F3) and the ground point (F2) of the starter (Uf) are not directly connected to the two ends of the secondary winding (Sf) of the high voltage transformer (Tf), and since the components such as the diode (Df), the resistor, and the like are series connected, no current or an extremely small current flows between the output point (F3) and the ground point (F2). Also in the case in which the diode (Df) is inserted, hardly any reduction of the voltage occurs (voltage in the case in which the current flows in the forward direction or the reverse direction). Even if the resistor has been inserted, hardly any voltage drop occurs. The result of the cathode, especially the area in the vicinity of the hermetically sealed portion (13A), reaching a higher electrical potential than the coil (CEt) which surrounds it is therefore effectively developed.

We claim:

1. A light source comprising:
   a discharge lamp in which a pair of main discharge electrodes are located opposite a discharge space;
   an auxiliary electrode arranged such that it does not come into contact with the discharge space;
   a feed circuit that supplies a discharge current to the main discharge electrodes; and
   a starter that produces a high voltage between one of the main discharge electrodes and the auxiliary electrode, wherein, during a time interval during which the starter produces said high voltage, a high voltage is also applied to the main discharge electrodes at least during a portion of the time interval.

2. The light source of claim 1, wherein the starter is made such that the high voltage applied to the main discharge electrodes is at least 2.5 times as high as a glow discharge voltage of the discharge lamp.

3. The light source of claim 1, wherein the discharge lamp contains at least 0.15 mg mercury per cubic millimeter of volume of the discharge space, and the high voltage is greater than or equal to 500 V.

4. The light source of claim 1, wherein the high voltage is pulse-like.

5. The light source of claim 2, wherein the high voltage is pulse-like.

6. The light source of claim 3, wherein the high voltage is pulse-like.

7. The light source of claim 1, wherein when a discharge by the high voltage from the starter is produced within the discharge space, the main discharge electrode which is located on the side on which the starter is not connected is charged.

8. The light source of claim 2, wherein when a discharge is produced within the discharge space, the main discharge electrode located on the side to which the starter is not connected is charged.

9. The light source of claim 3, wherein when a discharge is produced within the discharge space, the main discharge electrode which is located on the side to which the starter is not connected is charged.

10. The light source of claim 4, wherein when a discharge is produced within the discharge space, the main discharge electrode which is located on the side to which the starter is not connected is charged.

11. The light source of claim 1, further comprising a high voltage generator which is separated from the feed circuit part and comprises at least one starter circuit high voltage transformer.

12. The light source of claim 2, further comprising a high voltage generator which is separated from the feed circuit and comprises at least one starter circuit high voltage transformer.

13. The light source of claim 3, further comprising a high voltage generator which is separated from the feed circuit and comprises at least one starter circuit high voltage transformer.

14. The light source of claim 4, further comprising a high voltage generator which is separated from the feed circuit and comprises at least one starter circuit high voltage transformer.

15. The light source of claim 5, further comprising a high voltage generator which is separated from the feed circuit part and comprises at least one starter circuit high voltage transformer.

* * * * *